United States Patent
Seki et al.

(10) Patent No.: US 7,826,346 B2
(45) Date of Patent: Nov. 2, 2010

(54) MULTIPLE-INPUT MULTIPLE-OUTPUT TRANSMISSION SYSTEM

(75) Inventors: Hiroyuki Seki, Kawasaki (JP); Yoshinori Tanaka, Kawasaki (JP); Daisuke Jitsukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 909 days.

(21) Appl. No.: 11/233,189

(22) Filed: Sep. 22, 2005

(65) Prior Publication Data

US 2006/0114813 A1  Jun. 1, 2006

Related U.S. Application Data

(63) Continuation of application No. PCT/JP03/08297, filed on Jun. 30, 2003.

(51) Int. Cl.
 H04W 4/00 (2009.01)
 H04J 1/16 (2006.01)
 H04B 7/00 (2006.01)
(52) U.S. Cl. .................. 370/216; 370/328; 455/513
(58) Field of Classification Search ............. 370/328, 370/216–236; 714/18, 748, 749; 375/240.27, 375/304
 See application file for complete search history.

(56) References Cited

U.S. PATENT DOCUMENTS

| | | | |
|---|---|---|---|
| 5,799,245 A | | 8/1998 | Ohashi |
| 6,600,933 B1 * | | 7/2003 | Hiramatsu et al. .......... 455/561 |
| 6,700,867 B2 * | | 3/2004 | Classon et al. ............. 370/216 |
| 7,203,508 B2 * | | 4/2007 | Ohkubo et al. ............. 455/510 |
| 7,298,717 B2 * | | 11/2007 | Hui et al. ................... 370/329 |
| 2003/0003937 A1 | | 1/2003 | Ohkubo et al. |
| 2004/0136349 A1 * | | 7/2004 | Walton et al. .............. 370/338 |

FOREIGN PATENT DOCUMENTS

| | | |
|---|---|---|
| EP | 1 207 645 | 5/2002 |
| JP | 8-307330 | 11/1996 |
| JP | 2002-026796 | 1/2002 |
| JP | 2002-217752 | 8/2002 |
| JP | 2003-078480 | 3/2003 |
| JP | 2003-124915 | 4/2003 |

OTHER PUBLICATIONS

Notification of Reasons for Refusal dated Nov. 6, 2007, for the corresponding Japanese Application 2005-503369.

(Continued)

Primary Examiner—Chirag G Shah
Assistant Examiner—Srinivasa R Reddivalam
(74) Attorney, Agent, or Firm—Katten Muchin Rosenman LLP

(57) ABSTRACT

In a multiple-input multiple-output transmission system (MIMO system), a receive station detects whether or not there is an error in each data stream, estimates the state of the propagation path of each transmit antenna and reports, to the transmitting side, re-transmission necessary/unnecessary information, for every data stream, created based upon whether or not there is an error, and the state of the propagation path of each transmit antenna. A transmit station decides a transmit antenna that transmits a data stream requiring re-transmission, based upon the reported state of the propagation path of each transmit antenna, and re-transmits the data stream requiring re-transmission from the transmit antenna decided.

12 Claims, 15 Drawing Sheets

OTHER PUBLICATIONS

International Search Report dated Sep. 2, 2003.
P.W. Wolniansky. V-BLAST: An Architecture for Realizing Very High Data Rates Over the Rich-Scattering Wireless Channel. ISSSE-98.

Gerard J. Foshini. Layered Space-Time Architecture for Wireless Communication in a Fading Environment When Using Multi-Element Antennas. Bell Labs Technical Journal, Autumn 1996.

* cited by examiner

MULTIPLE-INPUT MULTIPLE-OUTPUT TRANSMISSION SYSTEM

CROSS-REFERENCE TO RELATED APPLICATION

This application is a continuation of International Application PCT/JP03/08297, filed on Jun. 30, 2003, pending at the time of filing of this continuation application, the contents of which are herein wholly incorporated by reference.

BACKGROUND OF THE INVENTION

This invention relates to a transmission system having a multiple-input multiple-output (MIMO) architecture. More particularly, the invention relates to a multiple-input multiple-output transmission system, which has a plurality of transmit antennas and receive antennas and is capable of high-speed data transmission, and to a transmit station and receive station in this system.

Of special interest in present-day wireless communication systems is a spatial multiplex transmission technique in which transmission capacity is increased in proportion to the number of transmit antennas by transmitting different data streams in parallel from different transmit antennas. Different transmit antennas are arranged so as to be uncorrelated with one another and the data streams transmitted from each of the antennas are received by receive antennas upon traversing independent fading propagation paths.

By utilizing a plurality of receive antennas arranged so as to be uncorrelated with one another to establish a multiple-input multiple-output (MIMO) system, a channel correlation matrix having a high degree of freedom can be generated and it is possible to improve SNR when the spatially multiplexed data streams are demultiplexed.

FIG. 14 illustrates the architecture of a MIMO system, in which TR represents a transmit station and RV a receive station. Data streams $S_1$ to $S_M$ the number of which is the same as the number M of transmit antennas $ATT_1$ to $ATT_M$ are transmitted from the transmit antennas $ATT_1$ to $ATT_M$ upon undergoing processing such as data modulation, oversampling, D/A conversion, orthogonal modulation, frequency up-conversion and band-limiting filtering in respective ones of transmitters $TX_1$ to $TX_M$. The signals transmitted from the antennas $ATT_1$ to $ATT_M$ pass through independent fading channels $h_{mn}$ (m=1 to M, n=1 to N) and are multiplexed in space, after which they are received by N-number of receive antennas $ATR_1$ to $ATR_N$. The signals received by the receive antennas undergo processing such as filtering, frequency down-conversion, orthogonal detection and A/D conversion in receivers $RX_1$ to $RX_N$, whereby receive data streams $x_1$ to $x_n$ are generated. Since the receive data streams are in a form in which M-number of transmit data streams have been multiplexed, signal processing is applied to all of the receive data streams to thereby demultiplex and reproduce all of the transmit data streams.

FIGS. 15 and 16 illustrate examples of the structures of a transmitter and receiver in a conventional digital wireless communication system that does not include a MIMO system. The zone of the transmitters ($TX_1$ to $TX_M$) and the zone of receivers ($RX_1$ to $RX_N$) shown in FIG. 14 are enclosed as TX and RX by dashed lines in FIGS. 15 and 16, respectively. In stages ahead of the transmitter TX (FIG. 15), the transmit data is encoded in accordance with a prescribed encoding scheme, and the encoded data is mapped to two orthogonal axes I, Q in accordance with the modulation scheme (QPSK, 16QAM, 64QAM). Next, the transmit data has its pilot time-multiplexed and is then transmitted from a transmit antenna ATT upon being subjected to oversampling, D/A conversion, orthogonal modulation, frequency up-conversion and band-limiting filtering.

Filtering, frequency down-conversion, orthogonal detection and A/D conversion processing are executed in the receiver RX (FIG. 16). This is followed by channel estimation, synchronous detection, data demodulation (mapping) and data decoding processing.

Algorithms of signal processing of a data processing unit DPU, which demodulates the transmit data streams $S_1$ to $S_M$ (FIG. 14) from the receive signals, include a linear algorithm referred to as ZF (Zero-Forcing) or MMSE employing a matrix that is the inverse of a channel correlation matrix, and a non-linear algorithm typified by BLAST (Bell Laboratories Layered Space-Time). Also known is a method such as MLD (Maximum Likelihood Decoding), which does not use a matrix that is the inverse of a correlation matrix.

The following relations hold if the transmit data stream is represented by an M-dimension complex matrix S and the receive data stream by an N-dimension complex matrix X:

$$X = HS + V$$

$$E[VV^*] = \sigma_V I$$

where E represents an ensemble average, H an N×M complex channel matrix ($h_{11}$ to $h_{MN}$), and V a complex white-noise matrix of average value 0 at a variance $\sigma_V$. The "*" symbol represents a complex conjugate transposition of a matrix. Further, I represents an N-dimension unit matrix.

With the ZF algorithm, a transmit data stream is estimated according to the following equation:

$$\hat{S} = (H^*H)^{-1} H^* X$$

where H*H is referred to as a "channel correlation matrix". Since a matrix that is the inverse of the channel correlation matrix exists, the relation $N \geq M$ becomes necessary.

With the MMSE algorithm, a transmit data stream is estimated according to the following equations:

$$\hat{S} = (H^*H + \alpha I)^{-1} H^* X$$

$$\alpha = \sigma_V / \sigma_S = M / \rho$$

$$E[SS^*] = \sigma_S I$$

where ρ corresponds to the SNR per receive antenna. With MMSE, it becomes necessary to estimate SNR with good precision. However, since the influence of noise emphasis in ZF can be reduced, in general the characteristic is superior to that of ZF.

With the MLD algorithm, a transmit data stream is estimated according to the following equation:

$$\hat{S} = \arg\min_k \| X - HS_k \|^2 \, S_k \in \{S_1 \cdots S_K\} \, K = Q^M$$

where Q represents the number of signal-point placements of the modulated data. In QPSK, Q=4; in 16QAM, Q=16; in 64QAM, Q=64. Thus, with MLD, the amount of calculation involved in multivalued modulation becomes very large, and the amount of calculation increases exponentially with respect to the number of transmit antennas. Since calculation of a matrix that is the inverse of a channel correlation matrix is made unnecessary by MLD, the relation $N \geq M$ is unnecessary.

With regard to the BLAST algorithm, the details are set forth in Non-Patent References 1, 2 mentioned later.

Generally, in a MIMO system, a transmission error tends to occur in a data stream that has been transmitted from an antenna for which the state of propagation path is inferior to other transmit antennas. Since the antenna for which the state of the propagation path is poor changes owing to fading fluctuation, the data stream that gives rise to the transmission error also changes with time. Further, in a MIMO system, transmission error tends to occur also in a case where the correlation between antennas increases owing to the propagation environment. More specifically, in a case where a path of particularly high power exists, such as a direct wave or strong reflected wave, in a multipath propagation path, the correlation between antennas increases. Since the state of the propagation path changes in a complex manner, there are instances where a transmission error tends to occur in a specific data stream owing to an increase in correlation between specific antennas. The state of such antenna correlation also changes from moment to moment owing to movement of a mobile station or a change in the surrounding environment.

Thus, with a MIMO system, there is a tendency for error to concentrate in a certain specific data stream, and the data stream in which error concentrates changes with time. In high-speed wireless data transmission, application of re-transmission control such as ARQ (Automatic Repeat reQuest) in radio intervals is essential. FIG. 17 illustrates a conventional example of a case where re-transmission control is applied in a MIMO system. Components identical with those shown in FIG. 14 are Designated by like reference characters. A data stream that has been multiplexed in space is demultiplexed by signal processing in the data processing unit DPU, demodulation/decoding processing is applied by a data demodulator/decoder RDU and the result is input to an error detector EDT. The latter performs error detection for every data stream $\hat{s}_1, \hat{s}_2, \ldots \hat{s}_M$, and an ACK/NACK generator ANG reports the result (ACK/NACK) of error detection on a per-data-stream basis to the transmit station TR using the oppositely directed radio link (transmitter TX, transmit antenna ATT, receive antenna ATR, receiver RX). A re-transmission controller RTC of the transmit station TR performs re-transmission of a data stream applicable to NACK from among managing re-transmit buffers $RTB_1$ to $RTB_M$. The antenna used in transmission at this time is fixed. In other words, retransmission is performed using the same antenna as that used in the previous transmission.

In a case where re-transmission control is performed in a MIMO system, the antenna having the poor transmission path is used continuously when a re-transmission packet is transmitted from the same antenna. Consequently, a problem which arises is that the improvement in error rate by re-transmission is diminished and it becomes difficult to obtain re-transmission control gain. The problem becomes particularly acute if the change in fading or multipath environment is slow in comparison with re-transmission interval (round-trip time).

Patent Reference 1 is a first example of prior art of a MIMO system. In this first prior art, a receiver in a MIMO system detects the rate and power of each data stream and feeds these back to a transmitter, and the transmitter improves throughput by controlling the rate and power of the corresponding data stream based upon the rate and power that has been fed back. However, the first prior art does not improve error rate by re-transmission.

Patent Reference 2 is a second example of prior art of a MIMO system. In the second prior art, □ a transmitter creates at least two error-encoded streams from an information block and transmits these streams, and a receiver performs an error check on a per-stream basis and, if an error is detected, requests re-transmission only of an error-encoded stream for which an error has been detected, or □ a transmitter creates at least two error-encoded streams from an information block and transmits these streams, and a receiver combines the error-encoded streams, performs an error check and, if an error is detected, requests re-transmission of each error-encoded stream. Although the second prior art relates to re-transmission control, it does not improve error rate by re-transmission and does not raise re-transmission efficiency.

SUMMARY OF THE INVENTION

Accordingly, an object of the present invention is to improve error rate by re-transmission and raise re-transmission efficiency.

Non-Patent Reference 1: G. J. Foschini, "Layered Space-Time Architecture for Wireless Communication in a Fading Environment When Using Multi-Element Antennas," Bell Laboratories Technical Journal, vol. 1, no. 2, pp. 41-59, 1196

Non-Patent Reference 2: P. W. Wolniansky, G. J. Foschini, G. D. Golden, R. A. Valenzuela, "V-BLAST: An Architecture for Realizing Very High Data Rates Over the Rich-Scattering Wireless Channel," in Proc. ISSSE-98, Italy, September 1998

Patent Reference 1: Japanese Patent Application Laid-Open No. 2002-217752

Patent Reference 2: Japanese Patent Application Laid-Open No. 2003-124915

The present invention provides a multiple-input multiple-output transmission system having a transmit station for transmitting a plurality of data streams from respective ones of separate transmit antennas, and a receive station for demultiplexing and outputting the data streams, which have been multiplexed in space, from signals received at a plurality of receive antennas. The receive station includes means for detecting whether or not there is an error in each data stream; means for estimating state of the propagation path of each transmit antenna; and means for reporting, to the transmitting side, re-transmission necessary/unnecessary information, for every data stream, created based upon whether or not there is an error, and the state of the propagation path of each transmit antenna. The transmit station includes means for deciding a transmit antenna that transmits a data stream requiring re-transmission, based upon the reported state of the propagation path of each transmit antenna; and means for re-transmitting the data stream requiring re-transmission from the transmit antenna decided.

Furthermore, the receive station can be adapted in such a manner that instead of the state of the propagation path of each transmit antenna being reported to the transmitting side, the receive station decides a re-transmission transmit antenna based upon the state of the propagation path of the transmit antenna and reports identification information of this re-transmission antenna to the transmit station.

Means for deciding the transmit antenna of the transmit station or receive station decides the re-transmission transmit antenna in the following manner, by way of example: The transmit antenna deciding means ranks transmit antennas in order of descending superiority of the states of the propagation paths and, when a substream requiring re-transmission is to be re-transmitted, performs reallocation of the transmit antennas in an order that is the reverse of the order of ranking in such a manner that a data stream requiring re-transmission transmitted the previous time from a transmit antenna for which the state of the propagation path is poorest will be transmitted from a transmit antenna for which the state of the propagation path is best. As a result, in a case where re-transmission is performed in a MIMO system, the error rate of data transmitted the previous time from an antenna whose propagation path conditions were poor can be improved and re-transmission efficiency raised. Further, in a case where re-transmission is performed in a MIMO system, transmission can be made to succeed with a small number of re-transmissions and re-transmission efficiency can be raised.

DESCRIPTION OF THE PREFERRED EMBODIMENTS (A) First Embodiment

Figure 1:
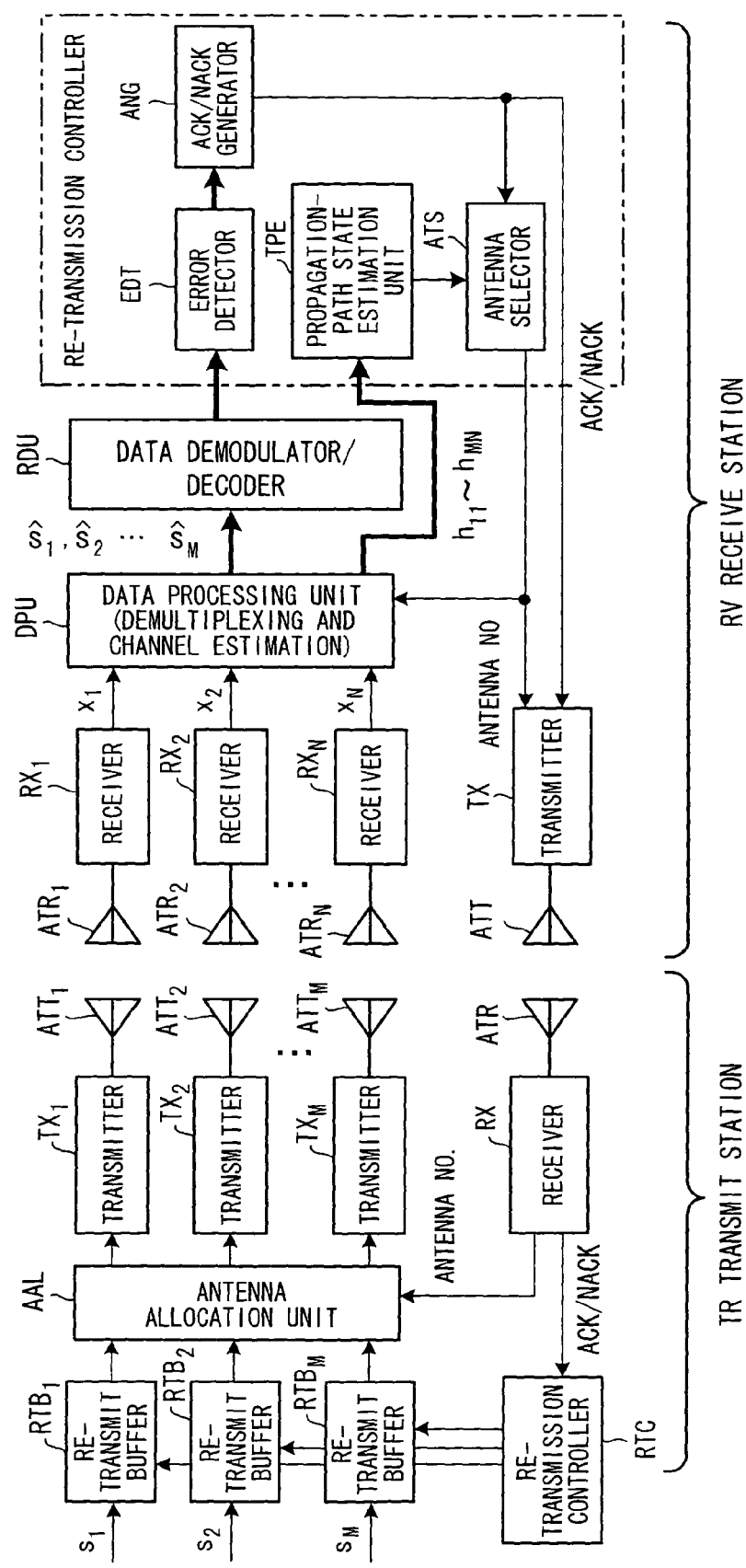
FIG. 1 is a diagram illustrating the architecture of a multiple-input multiple-output transmission system according to a first embodiment.
Figure 2:
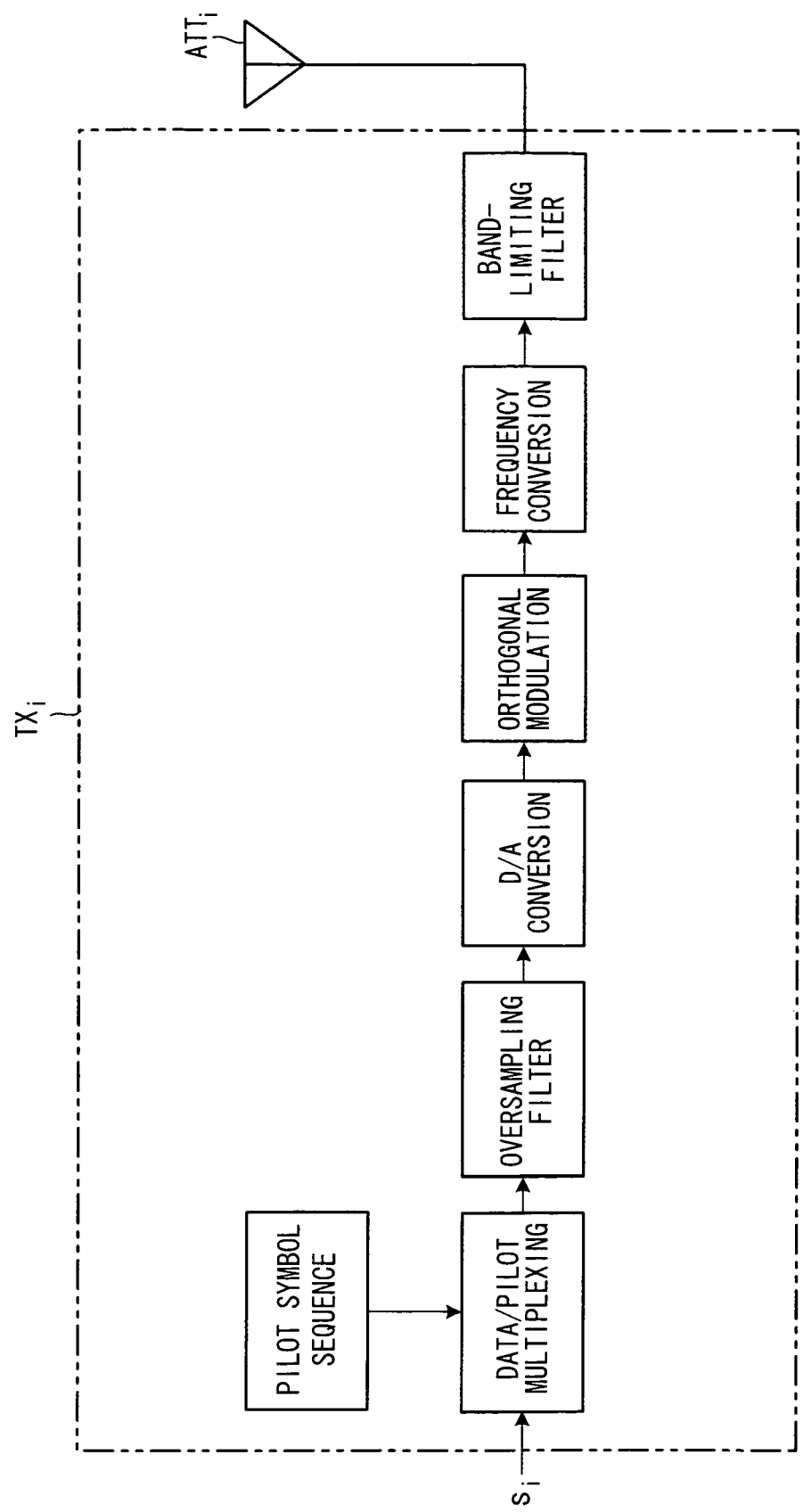
FIG. 2 is a diagram illustrating the structure of a transmitter in the multiple-input multiple-output transmission system.
Figure 3:
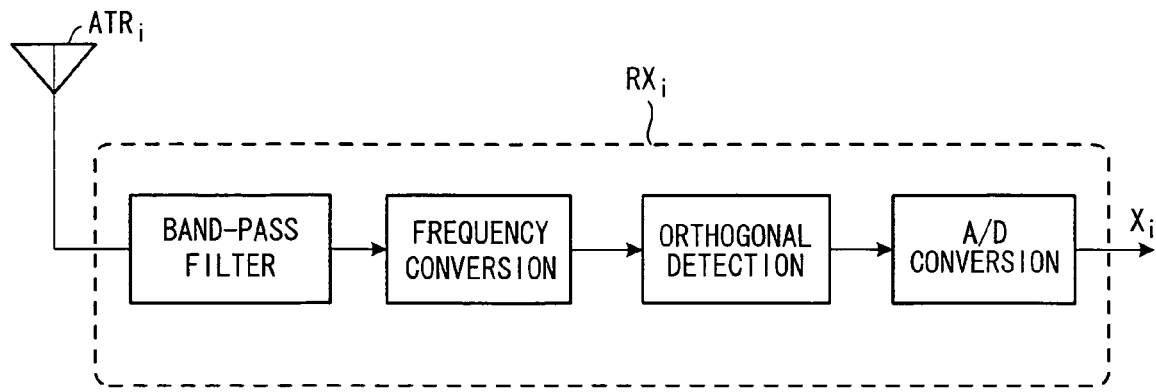
FIG. 3 is a diagram illustrating the structure of a receiver in the multiple-input multiple-output transmission system.

FIG. 1 is a diagram illustrating the architecture of a multiple-input multiple-output transmission system according to a first embodiment, FIG. 2 is a diagram illustrating the structure of a transmitter in the multiple-input multiple-output transmission system, and FIG. 3 is a diagram illustrating the structure of a receiver in the multiple-input multiple-output transmission system. Components identical with those of the example of the prior art are designated by like reference characters.

Overview of First Embodiment

A first embodiment detects ACK/NACK for every data stream in the receive station RV and, at the same time, estimates the state of the propagation path for every antenna using pilot symbols orthogonally multiplexed for every transmit antenna. Usually a data stream for which ACK will hold is transmitted from an antenna for which the state of the propagation path is good, and a data stream for which NACK will hold is transmitted from an antenna for which the state of the propagation path is poor. Accordingly, if a data stream for which NACK has been detected is to be re-transmitted, a comparison is made with the propagation path of a transmit antenna for which ACK has been detected and a selection is made so as to re-transmit the data stream using the antenna for which the state of the propagation path is better. It should be noted that the propagation path of an antenna for which ACK holds will often be better than the propagation path of an antenna for which NACK holds. Accordingly, the selection may be made so as to perform re-transmission using the transmit antenna for which ACK has been detected without making a comparison with the propagation path.

Operation of First Embodiment

In the receive station RV, the data processing unit DPU estimates the channels $h_{11}$ to $h_{MN}$ using pilot symbols and executes MIMO channel demultiplexing processing. When channel estimation is performed, the data processing unit DPU demodulates the pilot symbol and compares the phase and amplitude of the demodulated pilot symbol with the phase and amplitude of an already known pilot symbol to thereby estimate the characteristic $A \cdot \exp(j\phi)$ of the channels $h_{11}$ to $h_{MN}$. Since the pilot symbols transmitted from each of the transmit antennas are orthogonal, the data processing unit DPU is capable of estimating the channels $h_{11}$ to $h_{MN}$.

Further, when channel demultiplexing in a MIMO system is performed, the data processing unit DPU uses a method such as ZF, MMSE, BLAST or MLD mentioned above. The error detector EDT performs error detection for every demultiplexed data stream $\hat{s}_1, \hat{s}_2, \ldots \hat{s}_M$ by a method such as CRC check, and the ACK/NACK generator ANG reports the result (ACK/NACK) of error detection on a per-data-stream basis to the transmit station using the oppositely directed radio link (transmitter TX, transmit antenna ATT, receive antenna ATR, receiver RX).

A propagation-path estimation unit TPE estimates the state (reception power S or SIR) of the propagation path of every transmit antenna using the channel estimation results $h_{11}$ to $h_{MN}$. For example, the propagation-path estimation unit TPE estimates reception power Si of a transmit antenna ATTi (i=1 to M) according to the following equation:

$$Si = |h_{i1}|^2 + |h_{i2}|^2 + \ldots |h_{iN}|^2$$

An antenna selector ATS decides the transmit antenna to be used in re-transmission based upon propagation-path information and ACK/NACK information. An antenna for which power Si is high, namely for which the state of the propagation path is good, is selected as the transmit antenna used in re-transmission. Information (an antenna number) concerning the transmit antenna used in re-transmission is reported together with ACK/NACK information to the transmit station by a control channel in the oppositely directed link (receive station→transmit station). The information (an antenna number) concerning the transmit antenna used in re-transmission is reported to the data processing unit DPU as well and is used in order to demultiplex the data stream of the re-transmission.

On the basis of the ACK/NACK information reported from the receive station RV, the re-transmission controller RTC of the transmit station TR reads a data stream applicable to NACK out of the re-transmit buffers $RTB_1$ to $RTB_M$ and inputs the data stream to an antenna allocation unit AAL. The antenna allocation unit AAL inputs the re-transmission data stream applied thereto to a transmit antenna indicated by the antenna number reported from the receive station. By virtue of the operation above, re-transmission is performed from a transmit antenna for which the state of propagation is good.

Figure 4:
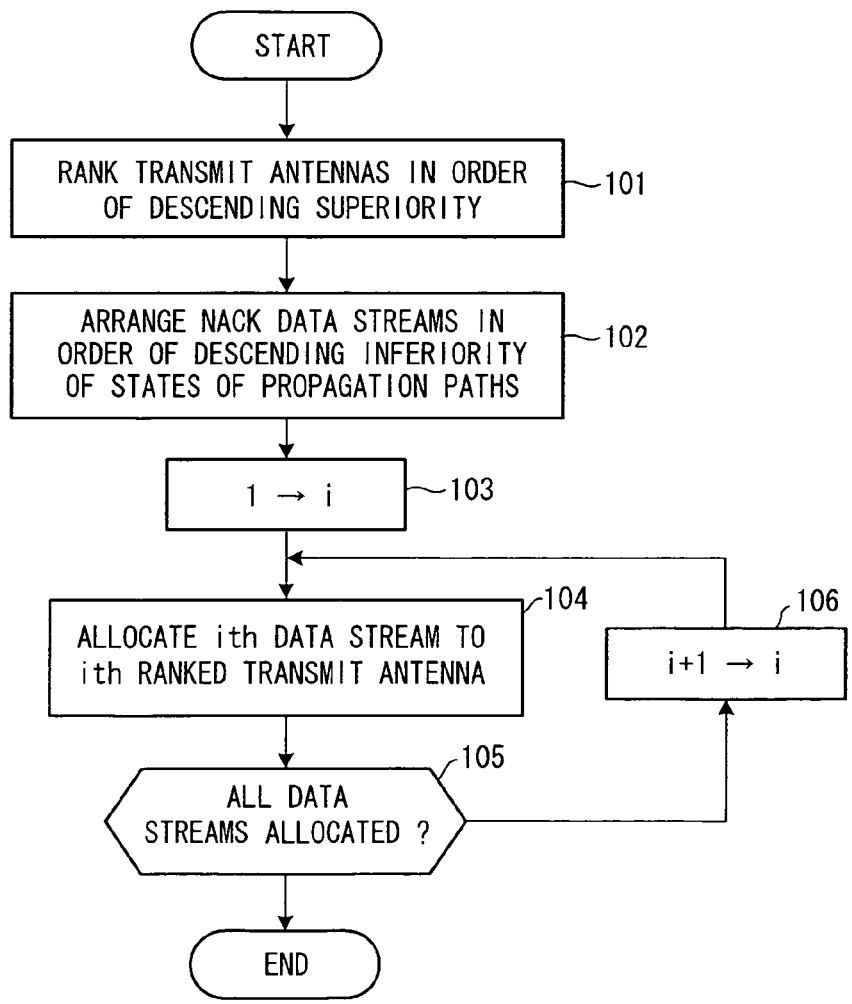
FIG. 4 is a flowchart illustrating processing executed by an antenna selector to decide a transmit antenna for re-transmission.

FIG. 4 is a flowchart illustrating processing executed by the antenna selector ATS to decide a transmit antenna for re-transmission. This flowchart can be employed in any of the embodiments that follow.

First, the transmit antennas are ranked in order of descending superiority of the states of the propagation paths (step 101). Next, data streams for which NACK has been detected are arranged in order of descending inferiority of the states of the propagation paths of their transmit antennas (step 102). The operation i=1 (step 103) is thenceforth performed and the ith data stream is allocated to the transmit antenna of the ith rank (step 104). As a result, if i=1 holds, a NACK data stream that has been transmitted from the transmit antenna for which the state of the propagation path is worst can be re-transmitted upon allocating it to the transmit antenna for which the state of the propagation path is best.

Next, it is determined whether the allocation of all re-transmission data streams has been completed (step 105). If allocation has not been completed, then i is incremented (step 106) and processing from step 104 onward is repeated.

Figure 5:
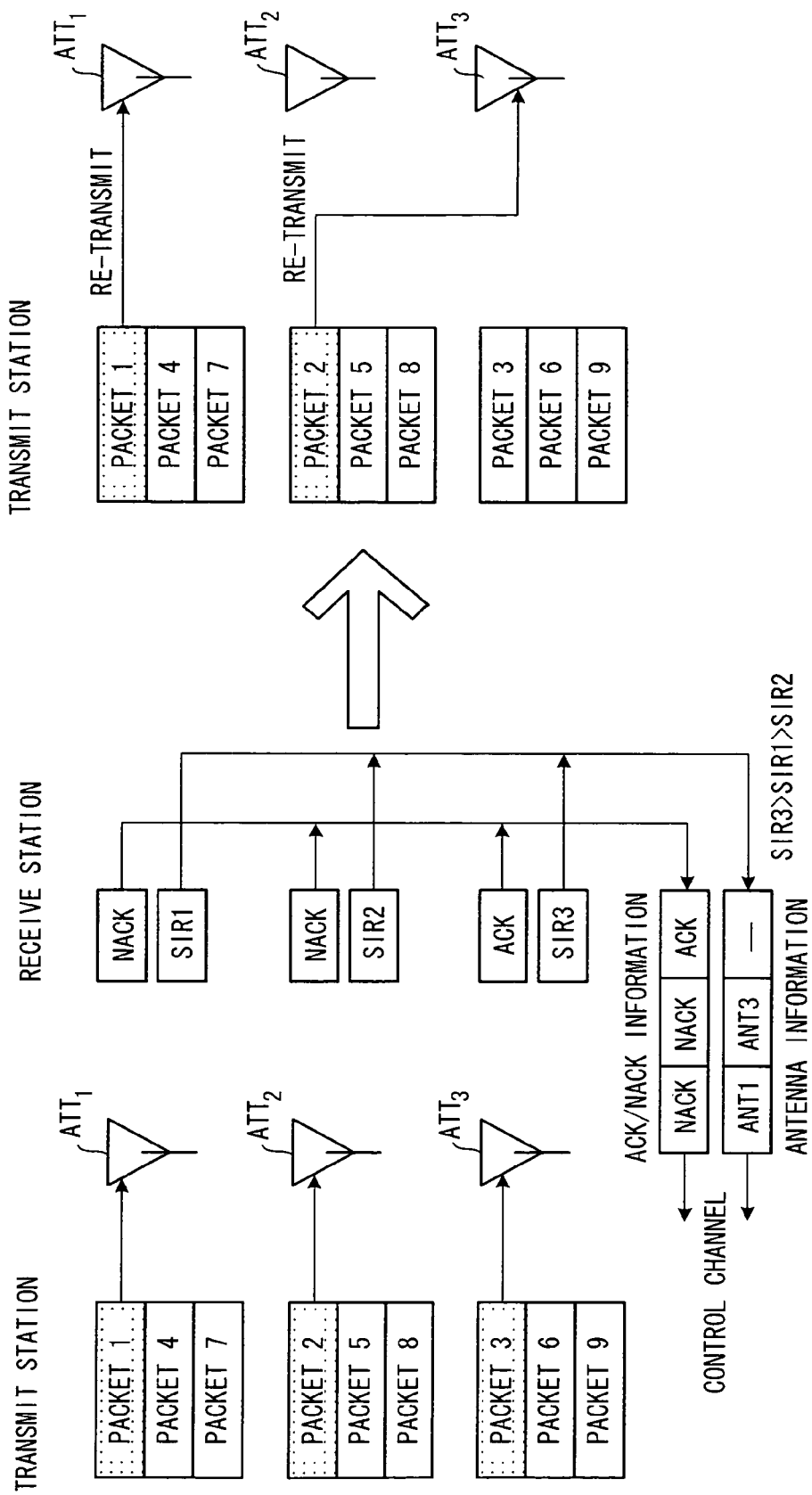
FIG. 5 is a diagram useful in describing re-transmission control according to the first embodiment of the present invention.

FIG. 5 is a diagram useful in describing re-transmission control according to the first embodiment of the present invention. Assume that when packets 1, 2 and 3 have been transmitted from transmit antennas ATT1 to ATT3, respectively, errors have occurred in packets 1 and 2 to give NACK and packet 3 has been received correctly to give ACK. Further, SIR, which indicates the state of the propagation paths of $ATT_1$ to $ATT_3$, is such that SIR3>SIR1>SIR2 holds. When the antenna selector ATS ranks the transmit antennas in order of descending superiority of the states of the propagation paths in accordance with the flowchart of FIG. 4, the result is

ATT3→ATT1→ATT2 and when the antenna selector arranges the NACK data streams in order of descending inferiority of the states of the propagation paths of their transmit antennas, the result is packet 2→packet 1

Accordingly, the antenna selector decides that packet 2 is to be transmitted by transmit antenna ATT3 and that packet 1 is to be transmitted by transmit antenna ATT1 and sends the ACK/NACK information and antenna information to the transmit station via the control channel. As a result, the transmit station re-transmits packet 1 by transmit antenna ATT1 and re-transmits packet 2 by transmit antenna ATT3, as indicated on the right side of FIG. 5.

By using the method set forth above, re-transmission efficiency can be raised by applying the present invention ☐ in a case where there are a plurality of NACK data streams, ☐ in a case where NACK is detected for all data streams and ☐ in a case where (number of ACK antennas)<(number of NACK antennas) holds. It should be noted that an effect of averaging the states of the propagation paths in combining of packets and raising the efficiency of re-transmission can be obtained to a certain extent by a method of allocating NACK transmit antennas randomly on a per-re-transmission basis.

Thus, in accordance with the first embodiment, the error rate of data transmitted the previous time from an antenna whose propagation path conditions were poor can be improved and re-transmission efficiency raised. Further, in a case where re-transmission control is performed in a MIMO system, transmission can be made to succeed with a small number of re-transmissions and re-transmission efficiency can be raised.

(B) Second Embodiment

Figure 6:
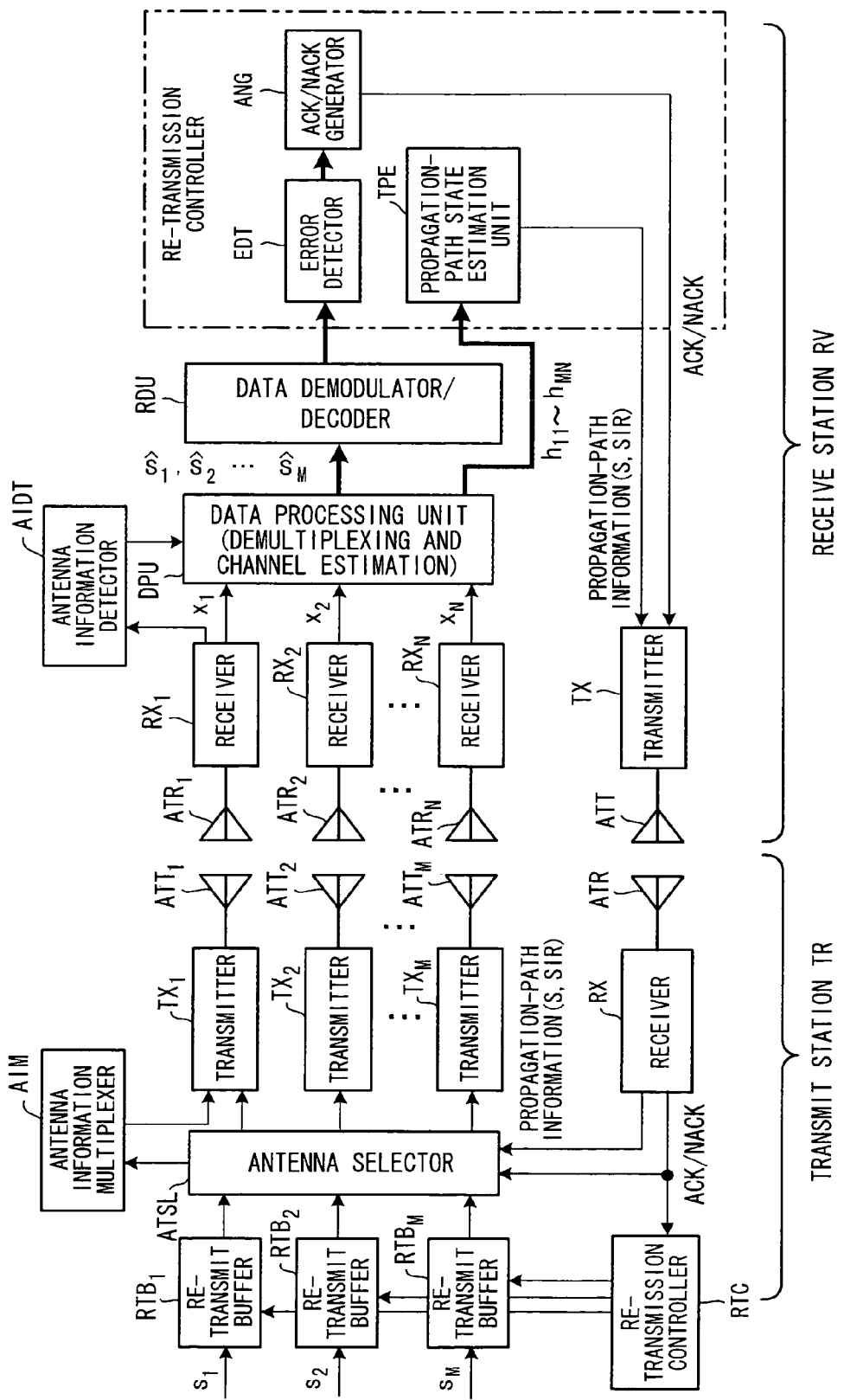
FIG. 6 is a diagram illustrating the architecture of a multiple-input multiple-output transmission system according to a second embodiment.

FIG. 6 is a diagram illustrating the architecture of a multiple-input multiple-output transmission system according to a second embodiment. Components identical with those of the first embodiment are designated by like reference characters.

Overview of Second Embodiment

In the first embodiment, a transmit antenna that is to re-transmit a NACK data stream is decided by the antenna selector ATS and reported to the transmit station. In the second embodiment, however, the state of the propagation path is transmitted to the transmit station. On the basis of the state of the propagation path, an antenna selector ATSL in the transmit station decides the transmit antenna that is to perform re-transmission.

More specifically, in the first embodiment, the arrangement is such that the antenna used in re-transmission is decided by the receive station. In the second embodiment, however, the arrangement is such that the antenna is decided by the transmit station. The receive station reports the propagation-path information (S, SIR), which has been estimated by the propagation-path estimation unit TPE, to the transmit station TR using the control channel of the oppositely directed link. On the basis of the propagation-path information and ACK/NACK information, the antenna selector ATSL of the transmit station selects the antenna to be used in re-transmission and executes allocation processing. The information concerning the transmit antenna that has been decided by the transmit station is reported to the receive station RV by a control channel that uses one or a plurality of transmitters. This is performed by an antenna information multiplexer AIM. The receive station detects the antenna selection information, which is reported by the control channel that is received by one or a plurality of receivers, in an antenna information detector AIDT and reports the information to the data processing unit DPU.

Operation of Second Embodiment

In the receive station RV, the data processing unit DPU estimates the channels $h_{11}$ to $h_{MN}$ using pilot symbols and executes MIMO channel demultiplexing processing (data-stream demultiplexing processing) in a manner similar to that of the first embodiment. The error detector EDT performs error detection for every demultiplexed data stream $\hat{s}_1, \hat{s}_2, \ldots \hat{s}_M$ by a method such as CRC check, and the ACK/NACK generator ANG reports the result (ACK/NACK) of error detection on a per-data-stream basis to the transmit station by the control channel using the oppositely directed radio link (transmitter TX, transmit antenna ATT, receive antenna ATR, receiver RX). The propagation-path estimation unit TPE estimates the state (reception power S or SIR) of the propagation path of every transmit antenna using the channel estimation results $h_{11}$ to $h_{MN}$ and, together with the ACK/NACK information, reports this to the transmit station by the control channel using the oppositely directed radio link.

On the basis of the ACK/NACK information reported from the receive station RV, the re-transmission controller RTC of the transmit station TR reads a data stream applicable to NACK out of the re-transmit buffers $RTB_1$ to $RTB_M$ and inputs the data stream to the antenna selector ATSL. On the basis of the propagation-path information and ACK/NACK information, the antenna selector ATSL decides the transmit antenna to be used in re-transmission. The antenna for which the power S or SIR is high, i.e., for which the state of the propagation path is good, is selected as the transmit antenna to be used in re-transmission, and the information (antenna number) concerning this antenna is reported to the antenna information multiplexer AIM. The antenna selector ATSL subsequently inputs the data stream for re-transmission that has entered from the re-transmit buffer to the decided transmit antenna via the transmitter. As a result, re-transmission is performed by a transmit antenna for which the state of propagation is good. Further, the antenna information multiplexer AIM inputs the antenna number of the transmit antenna for re-transmission to the transmitter TX1 and transmits the antenna number from the transmit antenna ATT1 independently or multiplexed onto the re-transmission data stream.

The receivers $RX_1$ to $RX_N$ of the receive station input receive signals to the data processing unit DPU. The receiver RX1 inputs its receive signal to the antenna information detector AIDT. The antenna information detector AIDT identifies the re-transmission transmit antenna from the input signal and inputs this information to the data processing unit DPU. The latter uses this information to demultiplex and output the re-transmission data stream. By virtue of the operation above, re-transmission is performed from the transmit antenna for which the state of propagation is good. As a result, in accordance with the second embodiment, the error rate of data transmitted the previous time from an antenna whose propagation path conditions were poor can be improved and re-transmission efficiency raised. Further, in a case where re-transmission control is performed in a MIMO system, transmission can be made to succeed with a small number of re-transmissions and re-transmission efficiency can be raised.

It should be noted that the antenna selector ATSL can decide the antenna for re-transmission in accordance with the processing flow of FIG. 4. By so doing, the states of the propagation paths in a packet combiner can be averaged and the efficiency of re-transmission raised.

(C) Third Embodiment

Figure 7:
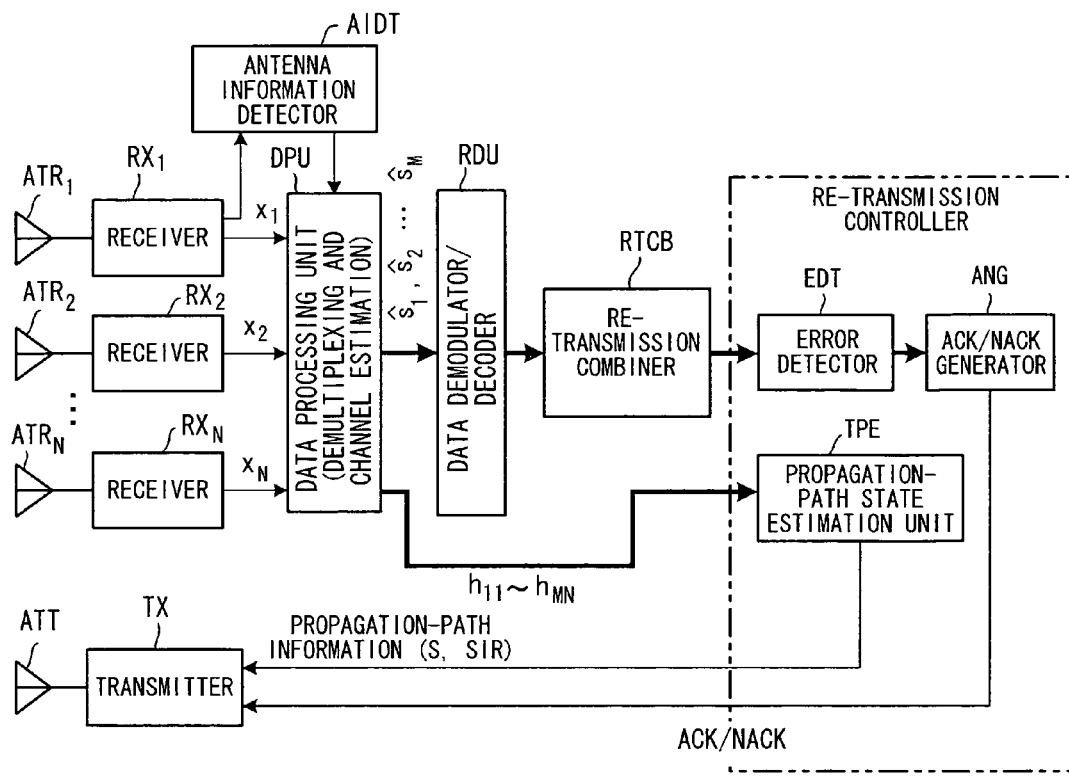
FIG. 7 is a diagram illustrating the structure of a receiver according to a third embodiment.

FIG. 7 is a diagram illustrating the structure of a receiver according to a third embodiment. This embodiment differs from the second embodiment in that a re-transmission combiner RTC is provided. It should be noted that although the transmit station is not illustrated, it has a structure identical with that of the second embodiment.

In order to improve the reception quality of the re-transmission signal, the re-transmission combiner RTC combines the re-transmission packet and a packet transmitted previously and for which NACK was detected. That is, an error-containing packet for which reception has failed and a re-transmission request (NACK information) been issued is stored in a re-transmission combining buffer by the re-transmission combiner RTCB. When a packet (data stream) that has been re-transmitted is received, the re-transmission combiner RTCB combines the re-transmission packet and the packet (data stream) inside the buffer. By thus combining the data, reception quality (the SIR of the receive data signal) is improved. The more the number of re-transmissions increases, the greater the degree of improvement and the higher the success rate of packet reception.

Figure 8:
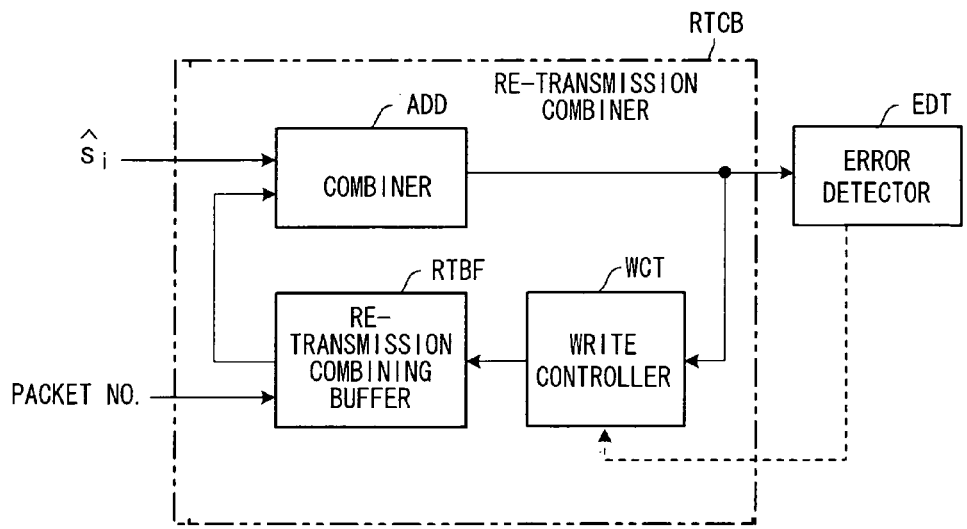
FIG. 8 is a block diagram of a re-transmission combining unit.

FIG. 8 is a block diagram of the re-transmission combining unit RTCB. A re-transmission combining buffer RTBF initially stores nothing. Consequently, a data stream (packet) $\hat{s}_1$ passes through an adder ADD and is input to the error detector EDT and a write controller WCT. If the result of error detection processing in the error detector EDT is that an error has not been detected, the write controller WCT stores nothing in the re-transmission combining buffer RTBF. Further, the ACK/NACK generator ANG (not shown) sends ACK to the transmit station. On the other hand, if the result of error detection processing in the error detector EDT is that an error has been detected, then the write controller WCT stores the error-containing packet in the re-transmission combining buffer RTBF upon attaching a packet number to it. Further, the ACK/NACK generator ANG sends NACK to the transmit station. As a result, when a NACK packet is re-transmitted from the transmit station, the packet corresponding to the number of this packet is read out of the re-transmission combining buffer RTBF and is input to the adder ADD. The latter combines the re-transmission packet and the packet that has been read out of the buffer and the result is output. By combining the data, reception quality is improved. The more the number of re-transmissions increases, the greater the degree of improvement and the higher the success rate of packet reception.

In the third embodiment, the antenna selector ATSL of the transmit station decides the transmit antenna in accordance with the processing flow of FIG. 4, and re-transmission is performed. If this arrangement is adopted, the following advantage is obtained: Since antenna allocation is performed using a ranking of the reverse order in such a manner that a data stream that has been transmitted from an antenna for which the state of the propagation path is most inferior is re-transmitted from an antenna for which the state of the propagation path is best, the effects of packet combining can be obtained by averaging over all data streams and it is possible to lower the probability that NACK data streams will occur.

In the third embodiment, the antenna used at the transmit station differs whenever re-transmission is performed. In the data processing unit DPU of the receive station, however, the antenna that has been used in re-transmission is discriminated and therefore the correct re-transmission packets can be combined. It should be noted that the third embodiment can be realized by providing the re-transmission combiner downstream of the data demodulator/decoder of the first embodiment.

(D) Fourth Embodiment

Figure 9:
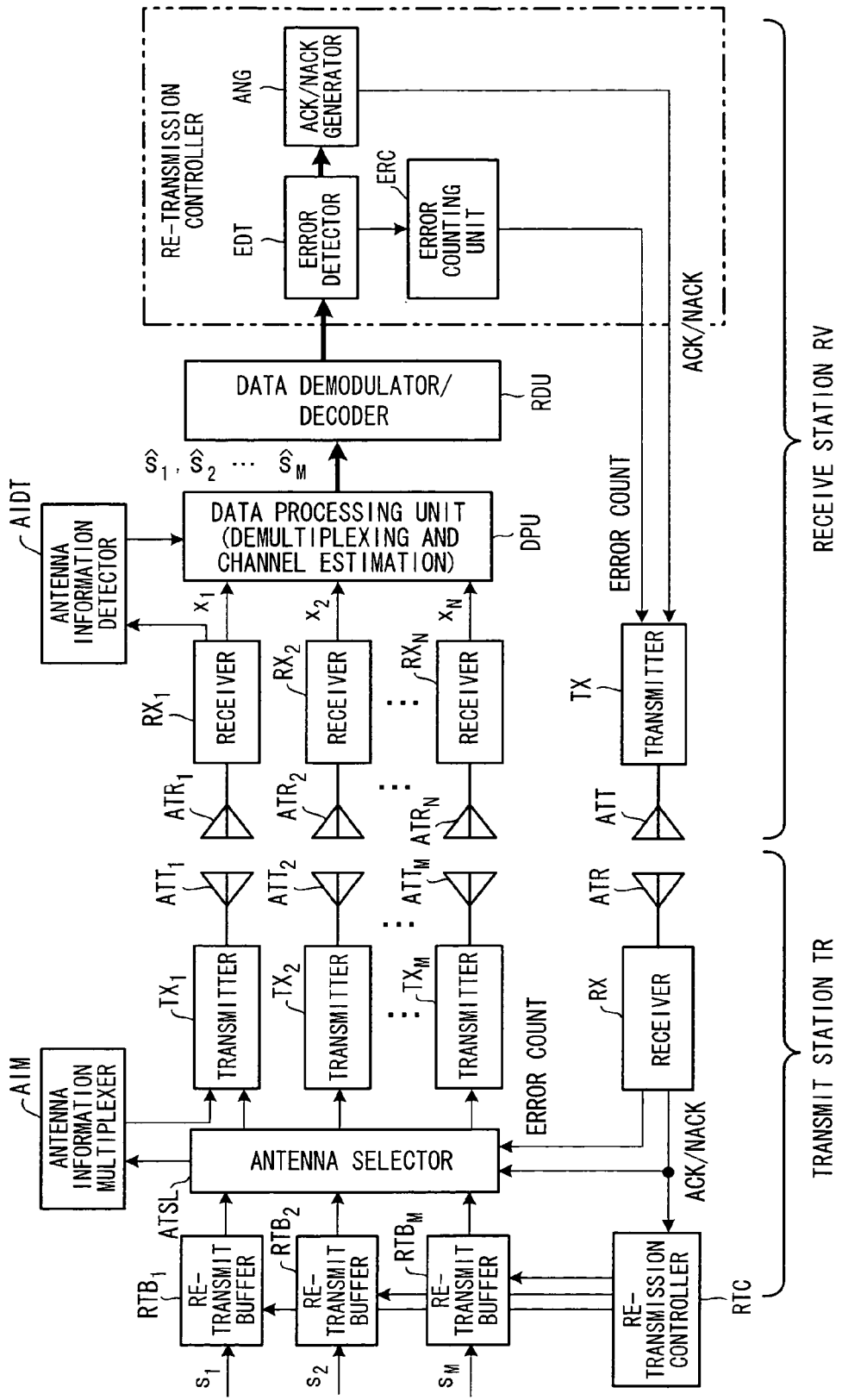
FIG. 9 is a diagram illustrating the structure of a receiver according to a fourth embodiment.

FIG. 9 is a diagram illustrating the structure of a fourth embodiment. Components identical with those of the second embodiment are designated by like reference characters. This embodiment differs in that ☐ instead of the propagation-path state estimation unit TPE, an error counting unit ERC is provided for counting the number of errors on a per-data-stream basis and sending the count to the transmit station, and ☐ the antenna selector ATSL of the transmit station decides the transmit antenna for re-transmission based upon the number of errors instead of the power S or SIR.

The error detector EDT performs error detection using CRC (Cyclic Redundancy Check) and is capable of discriminating the number of errors produced in each data stream. Accordingly, the error detector EDT sends the error-count information to the antenna selector ATSL and, on the basis of the error count, the antenna selector ATSL performs allocation in such a manner that the data stream for which the most errors occurred is re-transmitted using the antenna for which the state of the propagation path is best (the antenna having the smallest error count). If this arrangement is adopted, the propagation paths in the packet combiner can be averaged and the efficiency of re-transmission control improved. It should be noted that it is possible to adopt an arrangement in which the error counting unit ERC is provided instead of the propagation-path state estimation unit TPE in the first embodiment and the transmit antenna for re-transmission is decided based upon the error count.

(E) Other Means for Raising Efficiency of Re-transmission Control

A method of re-transmitting a NACK data stream using a plurality of antennas is conceivable as other means for raising the efficiency of re-transmission control in a MIMO system. The simplest method is a method of transmitting the same signal from a plurality of antennas. The method set forth below can be applied to any of the first to fourth embodiments.

Re-Transmission of the Same Signal Using a a Plurality of Antennas

Figure 10:
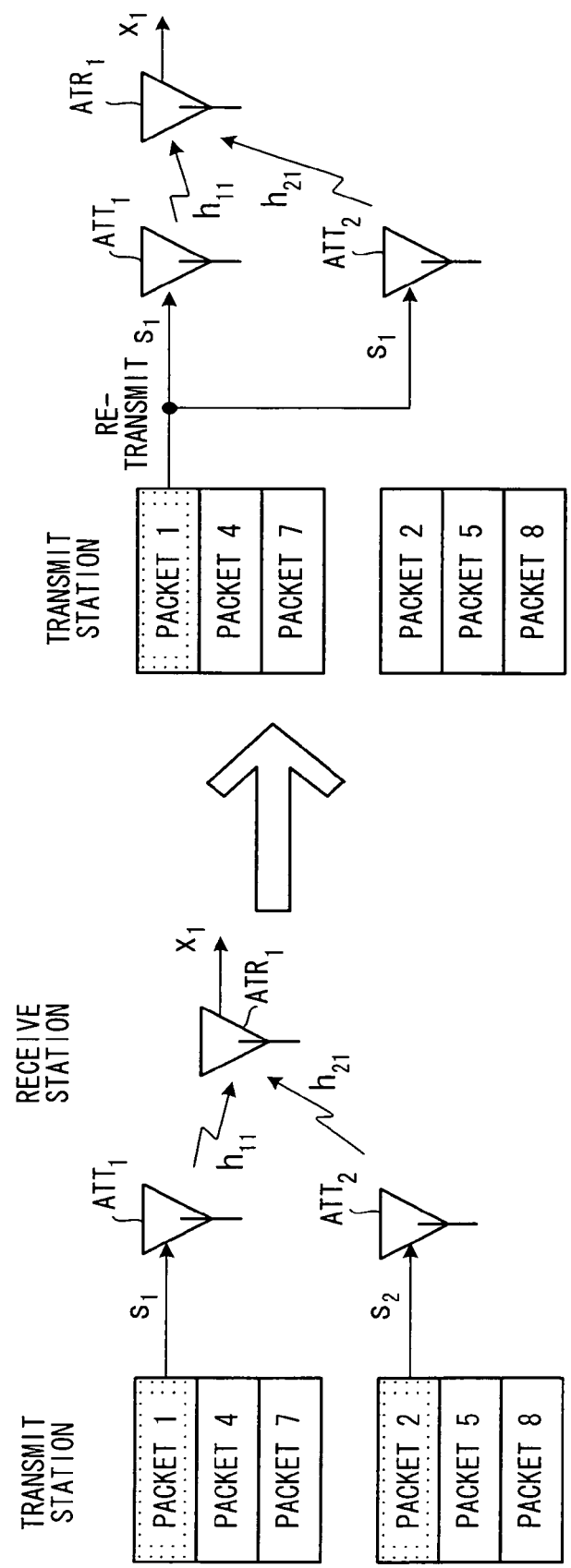
FIG. 10 is a diagram useful in describing means for raising the efficiency of re-transmission control in a MIMO system (here the same signal is re-transmitted using a plurality of antennas)

In a case where the number of transmit antennas is two and the number of receive antennas is one, as shown in FIG. 10, a new data stream at one receive antenna $ATR_1$ is expressed as follows (where the effects of noise are omitted in the considerations below):

$$x_1 = h_{11}s_1 + h_{21}s_2$$

where $s_1$ represents the transmit data signal from the antenna $ATT_1$, $s_2$ the transmit data signal from the antenna $ATT_2$, and $x_1$ the receive signal of the receive antenna $ATR_1$. If the transmit data signal $s_1$ is NACK and the transmit data signal $s_2$ is ACK, then the transmit data signal $s_1$ is re-transmitted from both antennas 1 and 2, as indicated on the right side. In this case, the receive signal $x_1$ of the receive antenna $ATR_1$ becomes as follows:

$$x_1 = h_{11}s_1 + h_{21}s_1 = (h_{11} + h_{21})s_1$$

Since the propagation paths from the two transmit antennas $ATT_1$, $ATT_2$ are independent, this corresponds to a situation in which the two signals are combined randomly in space and the transmission power is simply doubled. As a result, the error rate can be improved.

Re-Transmission Using STTD

Figure 11:
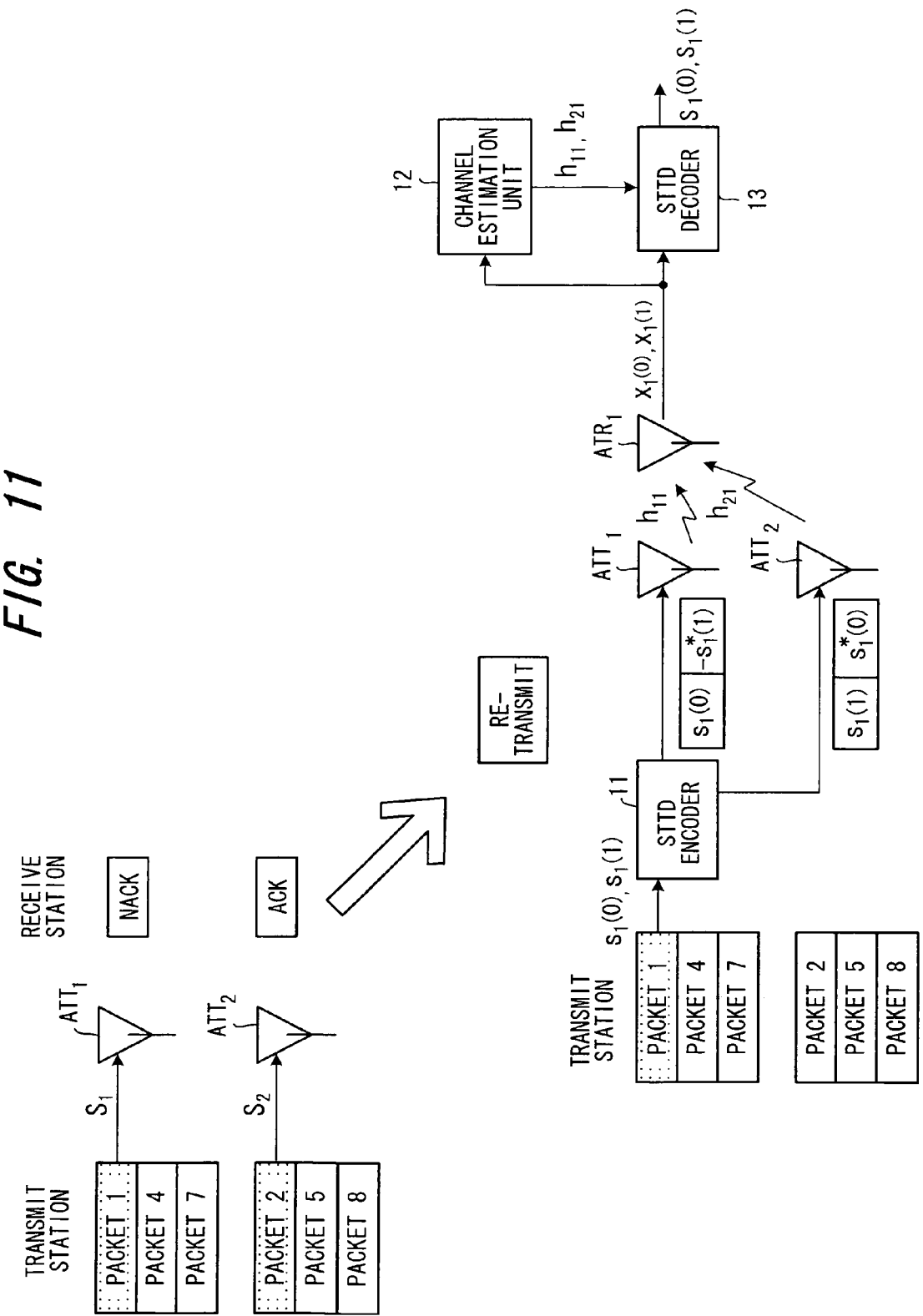
FIG. 11 is a diagram useful in describing means for raising the efficiency of re-transmission control in a MIMO system (here re-transmission is performed using STTD)

Transmit diversity gain can be obtained by using STTD (Space Time Transmit Diversity). FIG. 11 is a diagram for describing the principle of re-transmission that employs STTD. With the method of STTD, transmit data signals $s_1(0)$, $s_1(1)$ for which NACK has been detected are encoded by an STTD encoder 11 and the two sets of data obtained by encoding are input to two antennas $ATT_1$, $ATT_2$ whence the data is transmitted. Specifically, when the temporally continuous signals $s_1(0)$, $s_1(1)$ are input to the STTD encoder 11, the encoder outputs two sets of continuous signals $s_1(0)$, $-s_1^*(1)$ and $s_1(1)$, $s_1^*(0)$. As a result, the receive signals $x_1(0)$ $x_1(1)$ of the receive antenna ATR1 become as follows:

$$x_1(0) = h_{11}s_1(0) + h_{21}s_1(1)$$

$$x_1(1) = h_{11}s_1^*(0) + h_{21}s_1^*(1)$$

where $s_1(0)$, $s_1(1)$ represents transmit data symbols that are continuous in time, and $x_1(0)$, $x_1(1)$ denote receive data symbols that are continuous in time. At this time a channel estimation unit 12 and STTD decoder 13 of the receive station execute data processing indicated by the following equations:

$$\hat{s}_1(0) = h_{11}^*x_1(0) + h_{21}x_1^*(1) = (|h_{11}|^2 + |h_{21}|^2)s_1(0)$$

$$\hat{s}_1(1) = h_{11}^*x_1(1) - h_{21}x_1^*(0) = (|h_{11}|^2 + |h_{21}|^2)s_1(1)$$

As a result, transmit diversity gain is obtained and the error rate can be improved. It should be noted that re-transmission using STTD can be implemented by providing an STTD decoder at a suitable location of the transmit station of the first to fourth embodiments, e.g., within the antenna selector ATSL, and providing an STTD decoder at a suitable location of the receive station, e.g., within the data processing unit DPU.

Re-Transmission Upon Changing the Modulation Scheme or Encoding Rate

Figure 12:
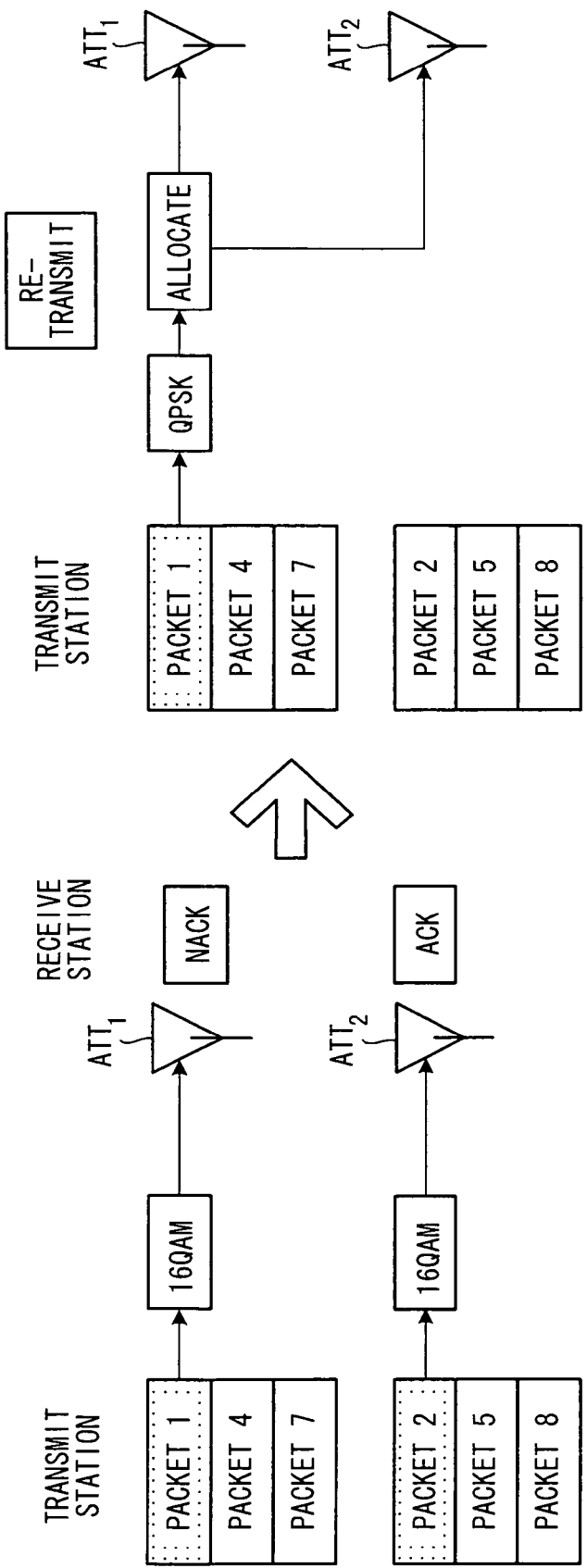
FIG. 12 is a diagram useful in describing means for raising the efficiency of re-transmission control in a MIMO system (here re-transmission is performed upon changing the modulation scheme)

By changing the modulation scheme or encoding rate, re-transmission can be carried out using a plurality of transmit antennas. FIG. 12 is a diagram for describing principles in a case where the modulation scheme is changed. For example, if one of two data streams that have been transmitted from the two antennas $ATT_1$, $ATT_2$ in 16QAM (four bits) is NACK and the other is ACK, the modulation scheme is changed to QPSK (two bits) when the NACK data stream is re-transmitted. By changing the modulation scheme to QPSK, the number of data-stream symbols is doubled and therefore the data streams are transmitted upon being allocated to the two transmit antennas $ATT_1$, $ATT_2$. As a result, re-transmission using a QPSK modulation scheme in which the influence of noise is small can be performed while the MIMO transmission method is kept as is.

Figure 13:
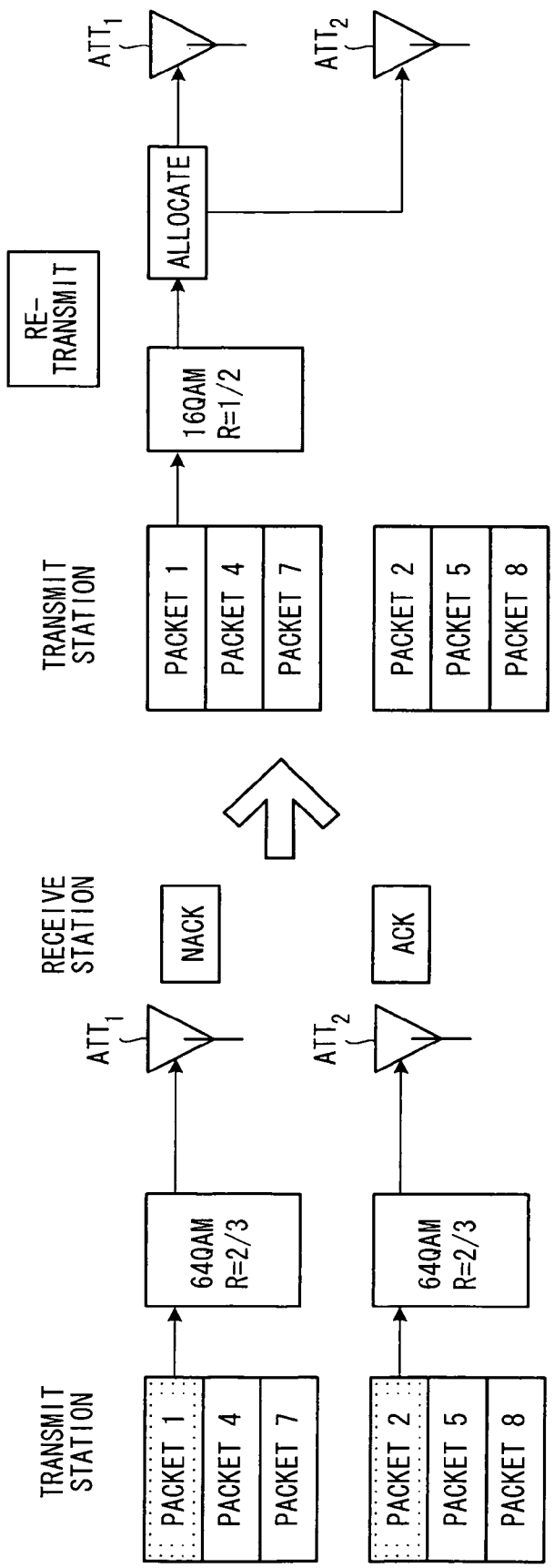
FIG. 13 is a diagram useful in describing means for raising the efficiency of re-transmission control in a MIMO system (here re-transmission is performed upon changing the modulation scheme or encoding rate)
Figure 14:
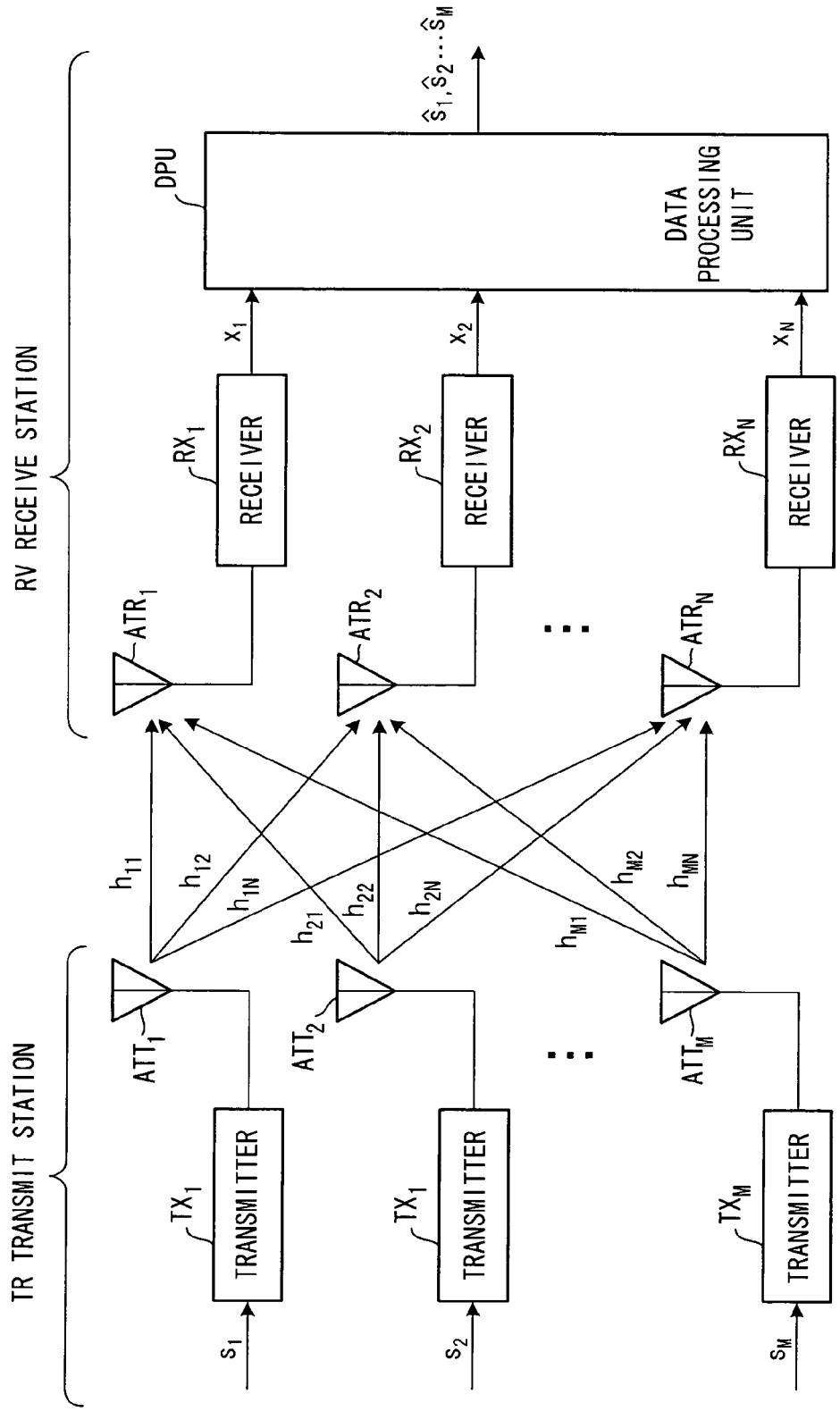
FIG. 14 is a diagram illustrating the architecture of a MIMO system.
Figure 15:
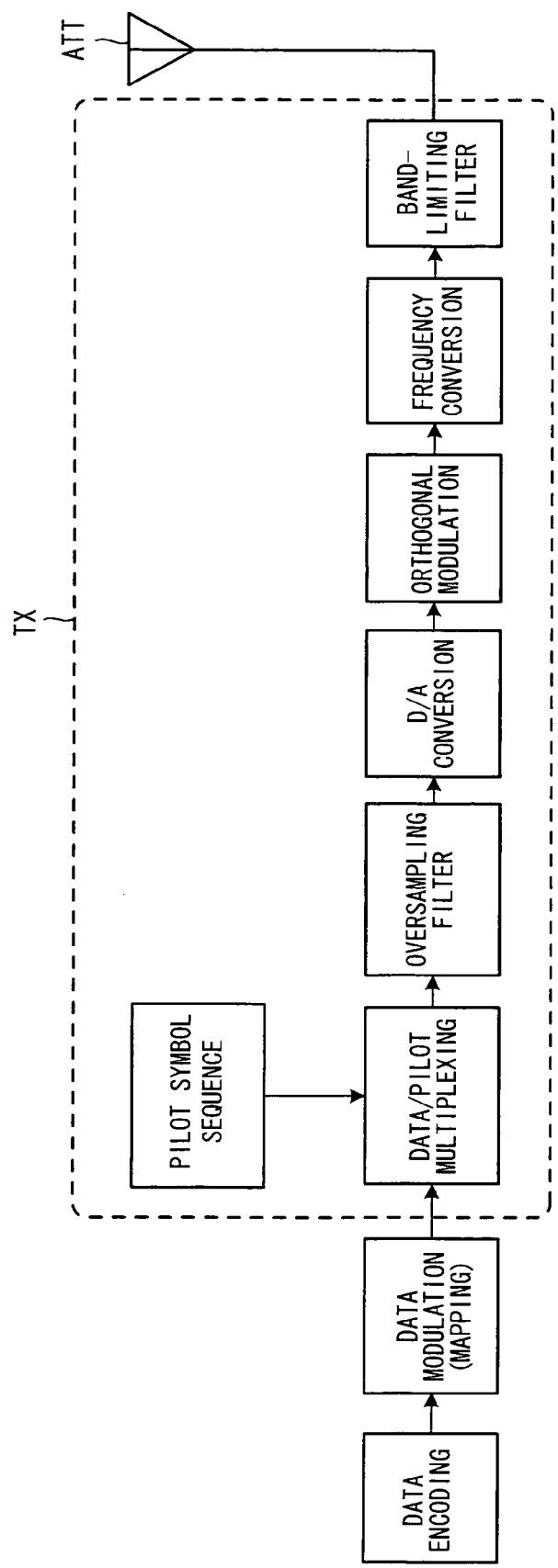
FIG. 15 is a diagram illustrating the structure of a receiver in a digital wireless communication system according to the prior art.
Figure 16:
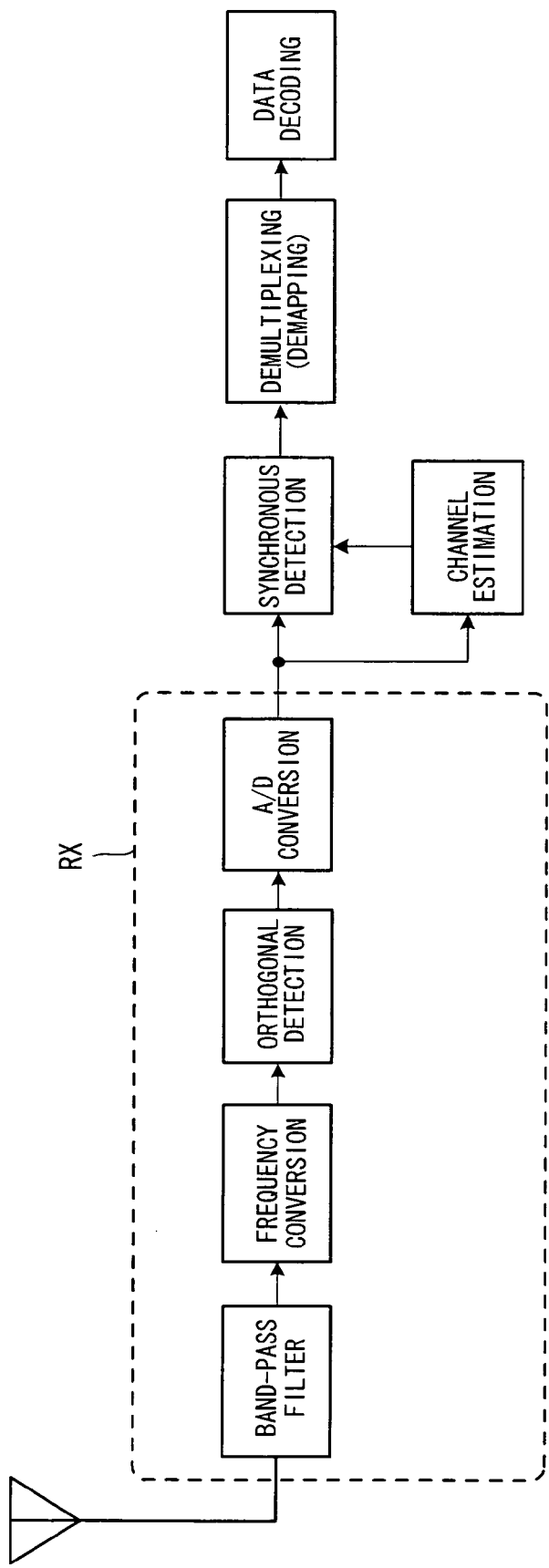
FIG. 16 is a diagram illustrating the structure of a transmitter in a digital wireless communication system according to the prior art.
Figure 17:
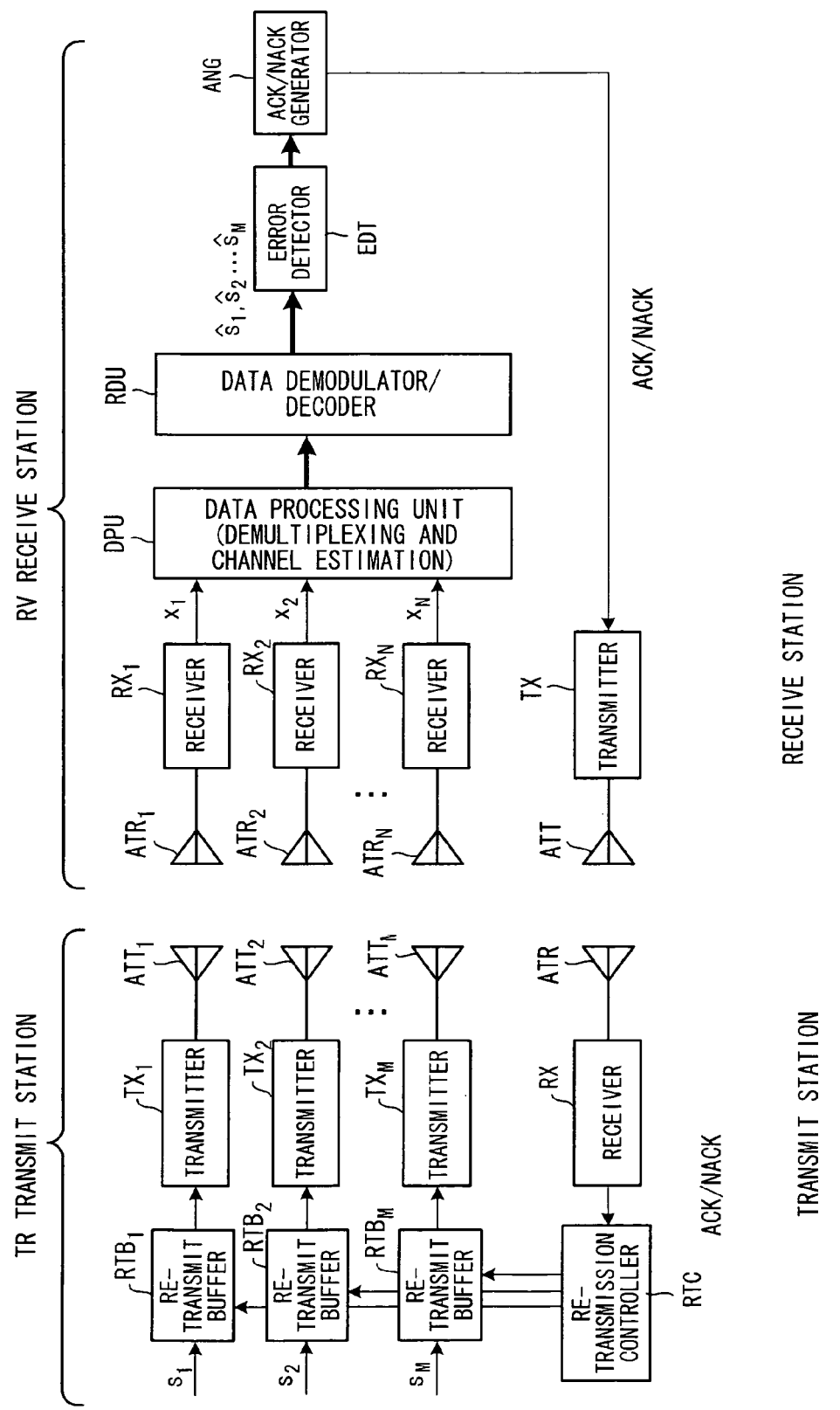
FIG. 17 is a diagram useful in describing an example of prior art in a case where re-transmission control is applied in a MIMO system.

Further, as illustrated in FIG. 13, in a case where modulation has been performed using 64QAM and a data stream that has undergone error-correcting encoding at an encoding rate $R=\frac{2}{3}$ is detected as being NACK, then the modulation scheme is changed to 16QAM and the encoding rate is made $R=\frac{1}{2}$. If this expedient is adopted, the number of data-stream symbols is doubled. Accordingly, if data streams are transmitted upon being allocated to the two transmit antennas $ATT_1$, $ATT_2$, then re-transmission can be performed using a modulation scheme in which the influence of noise is small and an encoding rate having a high error-correcting capability while the MIMO transmission method is kept as is. This method is effective in a case where MIMO channel separation functions well but errors remain owing to the limitations of the modulation scheme or encoding rate.

Thus, in accordance with the present invention, data error rate can be improved and re-transmission efficiency raised. Further, in a case where re-transmission control is performed in a MIMO system, transmission can be made to succeed with a small number of re-transmissions and the efficiency of re-transmission can be raised.

Additional Note

1. A multiple-input multiple-output transmission system having a transmit station for transmitting a plurality of data streams from respective ones of separate transmit antennas, and a receive station for demultiplexing and outputting said data streams, which have been multiplexed in space, from signals received at a plurality of receive antennas, characterized in that said receive station includes:

means for detecting whether or not there is an error in each data stream;

means for estimating state of the propagation path of each transmit antenna; and means for reporting, to a transmitting side, re-transmission necessary/unnecessary information, for every data stream, created based upon whether or not there is an error, and the state of the propagation path of each transmit antenna; and said transmit station includes:

means for deciding a transmit antenna that transmits a data stream requiring re-transmission, based upon the reported state of the propagation path of each transmit antenna; and means for re-transmitting the data stream requiring re-transmission from said transmit antenna decided.

2. A multiple-input multiple-output transmission system according to item 1, characterized in that said transmit station further includes means for reporting identification information identifying a transmit antenna, which transmits the data stream requiring re-transmission, to the receive station; and said receive station includes data-stream demultiplexing means for demultiplexing a re-transmitted data stream based upon the reported antenna identification information.

3. A multiple-input multiple-output transmission system having a transmit station for transmitting a plurality of data streams from respective ones of separate transmit antennas, and a receive station for demultiplexing and outputting said data streams, which have been multiplexed in space, from signals received at a plurality of receive antennas, characterized in that said receive station includes:

means for detecting whether or not there is an error in each data stream;

means for estimating state of the propagation path of each transmit antenna;

means for deciding a re-transmission transmit antenna based upon the state of the propagation path of said transmit antenna; and means for reporting, to a transmit station, re-transmission necessary/unnecessary information, for every data stream, created based upon whether or not there is an error, and identification information identifying the decided transmit antenna for re-transmission; and said transmit station includes means for re-transmitting the data stream requiring re-transmission from said reported transmit antenna for re-transmission.

4. A multiple-input multiple-output transmission system according to item 1 or 3, characterized in that said transmit station includes means for multiplexing mutually orthogonal pilot symbols onto each data stream and transmitting them from each transmit antenna; and said propagation-path state estimating means estimates the state of the propagation path of each antenna using a channel estimation value of each channel obtained using said pilot symbols.

5. A multiple-input multiple-output transmission system according to item 1 or 3, characterized in that said receive station includes:

a buffer memory for storing a data stream after demodulation; and combining means for combining a data stream that has been re-transmitted and the data stream that has been stored in the buffer memory;

said error detecting means applying error detection processing to the combined data streams.

6. A multiple-input multiple-output transmission system according to item 1 or 3, characterized in that the transmit antenna deciding means of said receive station or transmit station ranks transmit antennas in order of descending superiority of the states of the propagation paths and, when a data stream requiring re-transmission is to be re-transmitted, performs reallocation of the transmit antennas in an order that is the reverse of the order of ranking in such a manner that a data stream requiring re-transmission transmitted the previous time from a transmit antenna for which the state of the propagation path is poorest will be transmitted from a transmit antenna for which the state of the propagation path is best.

7. A multiple-input multiple-output transmission system according to item 1 or 3, characterized in that said error detecting means counts number of occurrences of error in a data stream requiring re-transmission, and the transmit antenna deciding means of said receive station or transmit station decides a transmit antenna for re-transmission in such a manner that a data stream for re-transmission that has been transmitted from an antenna having the highest error-occurrence count will be transmitted from an antenna for which the state of the propagation path is best.

8. A multiple-input multiple-output transmission system according to item 1 or 3, characterized in that in a case where all data streams or a plurality of data stream are required to be re-transmitted, the transmit antenna deciding means of said receive station or transmit station randomly allocates an antenna that re-transmits each data stream.

9. A multiple-input multiple-output transmission system according to item 1 or 3, characterized in that the transmit antenna deciding means of said receive station or transmit station performs antenna allocation in such a manner that a data stream requiring re-transmission will be re-transmitted from an antenna that transmitted a data stream for which re-transmission was not required.

10. A multiple-input multiple-output transmission system according to item 1 or 3, characterized in that the transmit antenna deciding means of said receive station or transmit station performs antenna allocation in such a manner that one data stream requiring re-transmission is re-transmitted using a plurality of antennas by utilizing also antennas that transmitted data streams for which re-transmission was not required.

11. A multiple-input multiple-output transmission system according to item 10, characterized in that said data stream re-transmitting means of the transmit station has a transmit diversity configuration and, when one data stream is to be re-transmitted using a plurality of antennas, transmits the data stream using said transmit diversity.

12. A multiple-input multiple-output transmission system according to item 10, characterized in that said data stream re-transmitting means of the transmit station has means for changing degree of modulation or encoding rate and, when one data stream is to be re-transmitted using a plurality of antennas, lowers the degree of modulation or reduces the encoding rate of a data stream to be re-transmitted, divides the data stream into a plurality of sub-data streams and transmits the sub-data streams using a plurality of antennas.

13. A receive station of a multiple-input multiple-output transmission system for transmitting a plurality of data streams from respective ones of separate transmit antennas and demultiplexing and outputting said data streams, which have been multiplexed in space, from signals received at a plurality of receive antennas, characterized by comprising:

a plurality of receive antennas for receiving signals that have been transmitted from a plurality of transmit antennas;

means for demultiplexing and demodulating data streams, which have been multiplexed in space, from signals received at said plurality of receive antennas;

means for detecting whether or not there is an error in each demodulated data stream;

means for estimating state of the propagation path of each transmit antenna; and means for reporting, to a transmitting side, re-transmission necessary/unnecessary information, for every data stream, created based upon whether or not there is an error, and the state of the propagation path of each transmit antenna;

wherein said data stream demultiplexing/demodulating means demultiplexes and demodulates a data stream that has been re-transmitted.

14. A receive station according to item 13, characterized in that said data stream demultiplexing/demodulating means demultiplexes and demodulates a re-transmitted data stream based upon identification information, which identifies a transmit antenna, sent from a transmit station.

15. A receive station of a multiple-input multiple-output transmission system for transmitting a plurality of data streams from respective ones of separate transmit antennas and demultiplexing and outputting said data streams, which have been multiplexed in space, from signals received at a plurality of receive antennas, characterized by comprising:

a plurality of receive antennas for receiving signals that have been transmitted from a plurality of transmit antennas;

means for demultiplexing and demodulating data streams, which have been multiplexed in space, from signals received at said plurality of receive antennas;

means for detecting whether or not there is an error in each demodulated data stream;

means for estimating state of the propagation path of each transmit antenna;

means for deciding a transmit antenna for re-transmission based upon the state of the propagation path of said transmit antenna;

means for reporting, to a transmit station, re-transmission necessary/unnecessary information, for every data stream, created based upon whether or not there is an error, and identification information identifying the decided transmit antenna for re-transmission;

wherein said data stream demultiplexing/demodulating means demultiplexes and demodulates a data stream that has been re-transmitted.

16. A receive station according to item 13 or 15, a buffer memory for storing a data stream after demodulation; and combining means for combining a data stream that has been re-transmitted and the data stream that has been stored in the buffer memory;

said error detecting means applies error detection processing to the combined data streams.

17. A transmit station of a multiple-input multiple-output transmission system for transmitting a plurality of data streams from respective ones of separate transmit antennas and demultiplexing and outputting said data streams, which have been multiplexed in space, from signals received at a plurality of receive antennas, characterized by comprising:

means for transmitting a plurality of data streams from respective ones of separate transmit antennas;

a receiver for receiving re-transmission necessary/unnecessary information for every data stream and the state of the propagation path of each transmit antenna;

means for deciding a transmit antenna that transmits a data stream requiring re-transmission, based upon the reported state of the propagation path of each transmit antenna; and means for re-transmitting the data stream requiring re-transmission from said transmit antenna decided.

18. A transmit station according to item 17, characterized by further comprising means for reporting identification information, which identifies a transmit antenna that re-transmits said data stream requiring re-transmission, to a receive station.

19. A transmit station of a multiple-input multiple-output transmission system for transmitting a plurality of data streams from respective ones of separate transmit antennas and demultiplexing and outputting said data streams, which have been multiplexed in space, from signals received at a plurality of receive antennas, characterized by comprising:

means for transmitting a plurality of data streams from respective ones of separate transmit antennas;

a receiver for receiving, from a receive station, re-transmission necessary/unnecessary information for every data stream and identification information identifying a transmit antenna for re-transmission; and means for re-transmitting a data stream requiring re-transmission from said reported transmit antenna for re-transmission.

20. A transmit station according to item 17 or 19, further comprising means for multiplexing and transmitting mutually orthogonal pilot symbols onto a data stream from each transmit antenna.

What is claimed is:

1. A multiple-input multiple-output transmission system having a transmit station for transmitting a plurality of data streams simultaneously from respective ones of separate transmit antennas, and a receive station for demultiplexing and outputting said data streams, which have been multiplexed in space, from signals received at a plurality of receive antennas, wherein said receive station comprises:

a controller that detects whether or not there is an error in each data stream, estimates a state of a propagation path of each transmit antenna, and reports, to a transmitting side, re-transmission necessary/unnecessary information, for every data stream, created based upon whether or not there is an error, and the state of the propagation path of each transmit antenna; and said transmit station includes:

a transmit antenna decision unit that decides plural transmit antennas, each of which transmits each data stream requiring re-transmission, based upon the reported state of the propagation path of each transmit antenna; and a re-transmission controller that controls re-transmission of the data streams requiring re-transmission from said plural decided transmit antennas, wherein the transmit antenna decision unit of said transmit station ranks the transmit antennas in order of descending superiority of the states of the propagation paths and, when data streams requiring re-transmission are to be re-transmitted, performs reallocation of the transmit antennas in an order that is reverse of the order of ranking in such a manner that a data stream requiring re-transmission transmitted a previous time from a transmit antenna for which the state of the propagation path is poorest will be transmitted from a transmit antenna for which the state of the propagation path is best.

2. The multiple-input multiple-output transmission system according to claim 1, wherein said transmit station further comprises a transmitter that transmits identification information identifying transmit antennas, which transmit the data streams requiring re-transmission, to the receive station; and said receive station comprises a data processing unit that performs demultiplexing of re-transmitted data streams based upon the reported antenna identification information.

3. A transmit station of a multiple-input multiple-output transmission system for transmitting a plurality of data streams simultaneously from respective ones of separate transmit antennas and demultiplexing and outputting said data streams, which have been multiplexed in space, from signals received at a plurality of receive antennas, the transmit station comprising:
 a receiver that receives re-transmission necessary/unnecessary information for every data stream and a state of a propagation path of each transmit antenna;
 a transmit antenna decision unit that decides plural transmit antennas, each of which transmits each data stream requiring re-transmission, based upon the reported state of the propagation path of each transmit antenna; and
 a re-transmission controller that controls re-transmission of the data stream requiring re-transmission from each of said plural decided transmit antennas, wherein
 the transmit antenna decision unit of said transmit station ranks the transmit antennas in order of descending superiority of the states of the propagation paths and, when data streams requiring re-transmission are to be re-transmitted, performs reallocation of the transmit antennas in an order that is reverse of the order of ranking in such a manner that a data stream requiring re-transmission transmitted a previous time from a transmit antenna for which the state of the propagation path is poorest will be transmitted from a transmit antenna for which the state of the propagation path is best.

4. The transmit station according to claim 3, further comprising a transmitter that transmits identification information, which identifies transmit antennas that re-transmit said data streams requiring re-transmission, to a receive station.

5. A multiple-input multiple-output transmission system having a transmit station for transmitting a plurality of data streams simultaneously from respective ones of separate transmit antennas, and a receive station for demultiplexing and outputting said data streams, which have been multiplexed in space, from signals received at a plurality of receive antennas, wherein said receive station comprises:
 a controller that detects whether or not there is an error in each data stream transmitted from each transmit antenna and counting a number of occurrences of error in each data stream;
 and reports, to a transmitting side, re-transmission necessary/unnecessary information, for every data stream, created based upon whether or not there is an error, and the number of occurrences of error in each data stream; and
 said transmit station comprises:
 a transmit antenna decision unit that decides plural transmit antennas, each of which transmits each data stream requiring re-transmission, based upon the reported number of occurrences of error in each data stream; and
 a re-transmission controller that controls re-transmission of the data streams requiring re-transmission from said plural decided transmit antennas, wherein
 the transmit antenna decision unit of said transmit station ranks the transmit antennas in order of descending superiority based on the reported number of occurrences of error in each data stream and, when data streams requiring re-transmission are to be re-transmitted, performs reallocation of the transmit antennas in an order that is reverse of the order of ranking in such a manner that a data stream requiring re-transmission transmitted a previous time from a transmit antenna having a highest error-occurrence count will be transmitted from a transmit antenna having a lowest error-occurrence count.

6. The multiple-input multiple-output transmission system according to claim 5, further comprising a transmitter that transmits identification information, which identifies transmit antennas that re-transmit said data streams requiring re-transmission, to a receive station.

7. A transmit station of a multiple-input multiple-output transmission system for transmitting a plurality of data streams simultaneously from respective ones of separate transmit antennas and demulitplexing and outputting said data streams, which have been multiplexed in space, from signals received at a plurality of receive antennas, the transmit station comprising:
 a receiver that receives from the receive station, re-transmission necessary/unnecessary information for each data stream transmitted from each transmit antenna and a number of occurrences of error in each data stream; and
 a transmit antenna decision unit that decides plural transmit antennas, each of which transmits each data stream requiring re-transmission, based upon the reported number of occurrences of error in each data stream; and
 a re-transmission controller that controls re-transmission of the data streams requiring re-transmission from said plural decided transmit antennas, wherein
 the transmit antenna decision unit ranks the transmit antennas in order of descending superiority based on the reported number of occurrences of error in each data stream and, when data streams requiring re-transmission are to be re-transmitted, performs reallocation of the transmit antennas in an order that is reverse of the order of ranking in such a manner that a data stream requiring re-transmission transmitted a previous time from a
 the plural transmit antennas are decided by:
 ranking the transmit antennas in order of descending superiority of the states of the propagation paths; and
 when data streams requiring re-transmission are to be re-transmitted, performing reallocation of the transmit antennas in an order that is the reverse of the order of ranking in such a manner that a data stream requiring re-transmission transmitted a previous time from a transmit antenna for which the state of the propagation path is poorest will be transmitted from a transmit antenna for which the state of the propagation path is best.

8. The transmit station according to claim 7, further comprising a transmitter that transmits identification information, which identifies transmit antennas that re-transmit said data streams requiring re-transmission, to a receive station.

9. A multiple-input multiple-output transmission method in a multiple-input multiple-output transmission system having a transmit station for transmitting a plurality of data streams simultaneously from respective ones of separate transmit antennas, and a receive station for demultiplexing and outputting the data streams, which have been multiplexed in space, from signals received at a plurality of receive antennas, wherein the method comprising in the receive station:
 detecting whether or not there is an error in each data stream;
 estimating a state of the propagation path of each transmit antenna; and
 reporting, to a transmitting side, re-transmission necessary/unnecessary information, for every data stream, created based upon whether or not there is an error, and the state of the propagation path of each transmit antenna; and the method comprising in the transmit station:

deciding plural transmit antennas, each of which transmits each data stream requiring re-transmission, based upon the reported state of the propagation path of each transmit antenna; and re-transmitting the data stream requiring re-transmission from the plural decided transmit antennas, wherein ranking the transmit antennas in order of descending superiority of the states of the propagation paths; and when data streams requiring re-transmission are to be re-transmitted, performing reallocation of the transmit antennas in an order that is the reverse of the order of ranking in such a manner that a data stream requiring re-transmission transmitted a previous time from a transmit antenna for which the state of the propagation path is poorest will be transmitted from a transmit antenna for which the state of the propagation path is best.

10. A multiple-input multiple-output transmission method in a transmit station of a multiple-input multiple-output transmission system for transmitting a plurality of data streams simultaneously from respective ones of separate transmit antennas and demultiplexing and outputting the data streams, which have been multiplexed in space, from signals received at a plurality of receive antennas, comprising:

transmitting the plurality of data streams from the respective ones of separate transmit antennas;

receiving re-transmission necessary/unnecessary information for every data stream and a state of a propagation path of each transmit antenna;

deciding plural transmit antennas, each of which transmits each data stream requiring re-transmission, based upon the reported state of the propagation path of each transmit antenna; and re-transmitting the data stream requiring re-transmission from each of the plural decided transmit antennas, wherein the transmit antennas are decided by: transmit antenna having a highest error-occurrence count will be transmitted from a transmit antenna having a lowest error-occurrence count.

11. A multiple-input multiple-output transmission method in a multiple-input multiple-output transmission system having a transmit station for transmitting a plurality of data streams simultaneously from respective ones of separate transmit antennas, and a receive station for demultiplexing and outputting said data streams, which have been multiplexed in space, from signals received at a plurality of receive antennas, wherein the method comprising in the receive station:

detecting whether or not there is an error in each data stream transmitted from each transmit antenna and counting a number of occurrences of error in each data stream; and reporting, to a transmitting side, re-transmission necessary/unnecessary information, for every data stream, created based upon whether or not there is an error, and the number of occurrences of error in each data stream; and the method comprising in the transmit station:

deciding plural transmit antennas, each of which transmits each data stream requiring re-transmission, based upon the reported number of occurrences of error in each data stream; and re-transmitting the data streams requiring re-transmission from the plural decided transmit antennas, wherein the plural transmit antennas are decided by:

ranking the transmit antennas in order of descending superiority based on the reported number of occurrences of error in each data stream; and when data streams requiring re-transmission are to be re-transmitted, performing reallocation of the transmit antennas in an order that is reverse of the order of ranking in such a manner that a data stream requiring re-transmission transmitted a previous time from a transmit antenna having a highest error-occurrence count will be transmitted from a transmit antenna having a lowest error-occurrence count.

12. A multiple-input multiple-output transmission method in a transmit station of a multiple-input multiple-output transmission system for transmitting a plurality of data streams simultaneously from respective ones of separate transmit antennas and demultiplexing and outputting the data streams, which have been multiplexed in space, from signals received at a plurality of receive antennas, comprising:

transmitting a plurality of data streams from respective ones of separate transmit antennas to a receive station;

receiving from the receive station, re-transmission necessary/unnecessary information for each data stream transmitted from each transmit antenna and a number of occurrences of error in each data stream; and deciding plural transmit antennas, each of which transmits each data stream requiring re-transmission, based upon the reported number of occurrences of error in each data stream; and re-transmitting the data streams requiring re-transmission from the plural decided transmit antennas, wherein the plural transmit antennas are decided by:

ranking the transmit antennas in order of descending superiority based on the reported number of occurrences of error in each data stream; and when data streams requiring re-transmission are to be re-transmitted, performing reallocation of the transmit antennas in an order that is reverse of the order of ranking in such a manner that a data stream requiring re-transmission transmitted a previous time from a transmit antenna having a highest error-occurrence count will be transmitted from a transmit antenna having a lowest error-occurrence count.

* * * * *